United States Patent [19]

Kable

[11] Patent Number: 4,678,869

[45] Date of Patent: Jul. 7, 1987

[54] POSITION RESPONSIVE APPARATUS, SYSTEM AND METHOD HAVING ELECTROGRAPHIC APPLICATION

[75] Inventor: Robert G. Kable, Dublin, Ohio

[73] Assignee: Scriptel Corporation, Columbus, Ohio

[21] Appl. No.: 865,661

[22] Filed: May 27, 1986

Related U.S. Application Data

[63] Continuation-in-part of Ser. No. 791,324, Oct. 25, 1985, abandoned.

[51] Int. Cl.⁴ .............................................. G08C 21/00
[52] U.S. Cl. ........................................ 178/19; 178/18
[58] Field of Search ...................... 178/18, 19; 364/571, 364/520; 340/36.5 C

[56] References Cited

U.S. PATENT DOCUMENTS

| | | | |
|---|---|---|---|
| 2,925,467 | 2/1960 | Becker | 178/18 |
| 3,449,516 | 6/1969 | Cameron et al. | 178/19 |
| 3,466,391 | 9/1969 | Ellis | 324/61 |
| 3,497,617 | 2/1970 | Ellis | 178/18 |
| 3,522,164 | 8/1970 | Lambright et al. | 178/18 |
| 3,530,241 | 9/1970 | Ellis | 178/18 |
| 3,588,345 | 6/1971 | Dym | 178/18 |
| 3,590,158 | 6/1971 | Pabst | 178/18 |
| 3,591,718 | 7/1971 | Asano | 178/19 |
| 3,624,293 | 11/1971 | Baxter | 178/18 |
| 3,632,874 | 1/1972 | Malavard | 178/18 |
| 3,648,277 | 3/1972 | Whetstone | 178/18 X |
| 3,699,439 | 10/1972 | Turner | 178/18 X |
| 3,885,097 | 5/1975 | Pobgee | 178/18 |
| 3,911,215 | 10/1975 | Hurst et al. | 178/18 |
| 3,921,165 | 11/1975 | Dym | 178/18 X |
| 3,992,579 | 11/1976 | Dym et al. | 178/18 |
| 4,018,989 | 4/1977 | Snyder | 178/18 X |
| 4,055,726 | 10/1977 | Turner et al. | 178/18 |
| 4,071,689 | 1/1978 | Talmage et al. | 178/18 |
| 4,079,194 | 3/1978 | Kley | 178/18 |
| 4,081,603 | 3/1978 | Davis et al. | 178/19 |
| 4,087,625 | 5/1978 | Dym et al. | 178/19 |
| 4,198,539 | 4/1980 | Pepper | 178/18 |
| 4,214,122 | 7/1980 | Kley | 178/18 |
| 4,302,011 | 11/1981 | Pepper | 178/19 X |
| 4,346,260 | 8/1982 | Kaufmann | 178/18 |
| 4,456,787 | 6/1984 | Schlosser et al. | 178/19 |
| 4,477,877 | 10/1984 | Nakamura | 178/18 X |
| 4,492,819 | 1/1985 | Rodgers et al. | 178/18 |

FOREIGN PATENT DOCUMENTS 0115025 9/1979 Japan ..................................... 178/18

Primary Examiner—Stafford D. Schreyer
Attorney, Agent, or Firm—Mueller and Smith

[57] ABSTRACT

A position responsive apparatus, system and method which employs a position responsive surface formed of two orthogonally disposed arrays of grid elements which in one embodiment, the elements are coupled along one border with a resistor chain or the equivalent which is excited with an a.c. source at terminal locations. Capacitive coupling between the orthogonally disposed arrays at the cross-over locations of grid elements is significantly reduced by reducing the area of the grid elements at the cross-over positions. Further, intermediate grounding terminals serve to minimize disruptive potentials caused by the capacitive coupling. The control for the system employs a procedure wherein a correction look-up table is developed as part of the manufacture of the apparatus wherein readings are taken at the nodal points of communication between the grid array and the resistor chain and which then are treated to provide a regularly incremented sequence of address values developed from a signal domain computation. Physical domain coordinate values are correspondingly derived and are located in the table with each address value. The control for the embodiment accesses this memory for purpose of developing corrected coordinate outputs, thus eliminating the need for precise calibration of each resistor within the resistor chain. The invention further contemplates the employment of transparent grid array elements. Significant improvements to performance are achieved by exciting these elements from resistor chains located and coupled therewith at oppositely disposed ends of the grid elements. An improved switching approach is provided wherein excitation currents are employed at the switching stage which then are applied to voltage follower stages for coupling with the grid array terminal.

31 Claims, 41 Drawing Figures

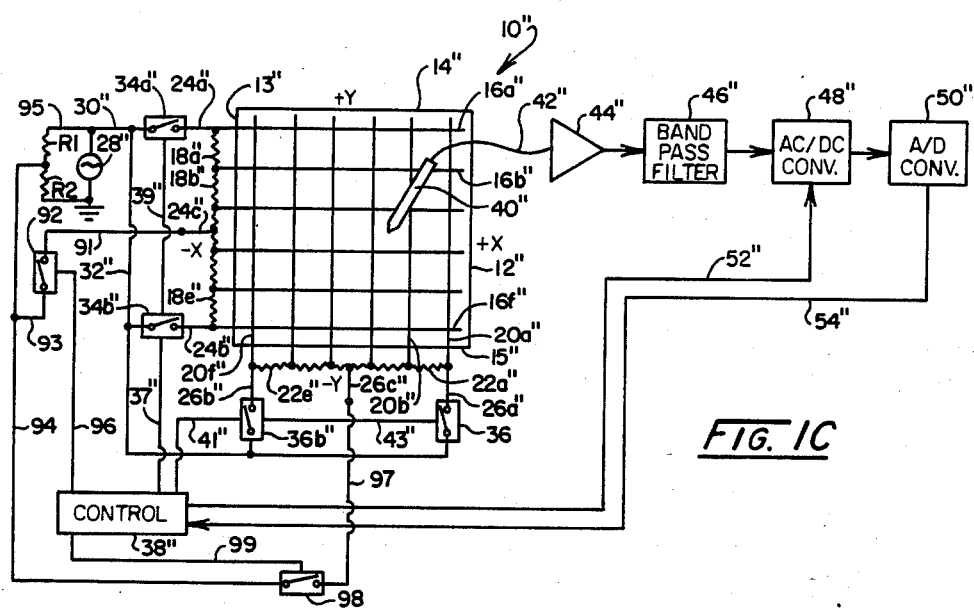
_FIG. 1C_
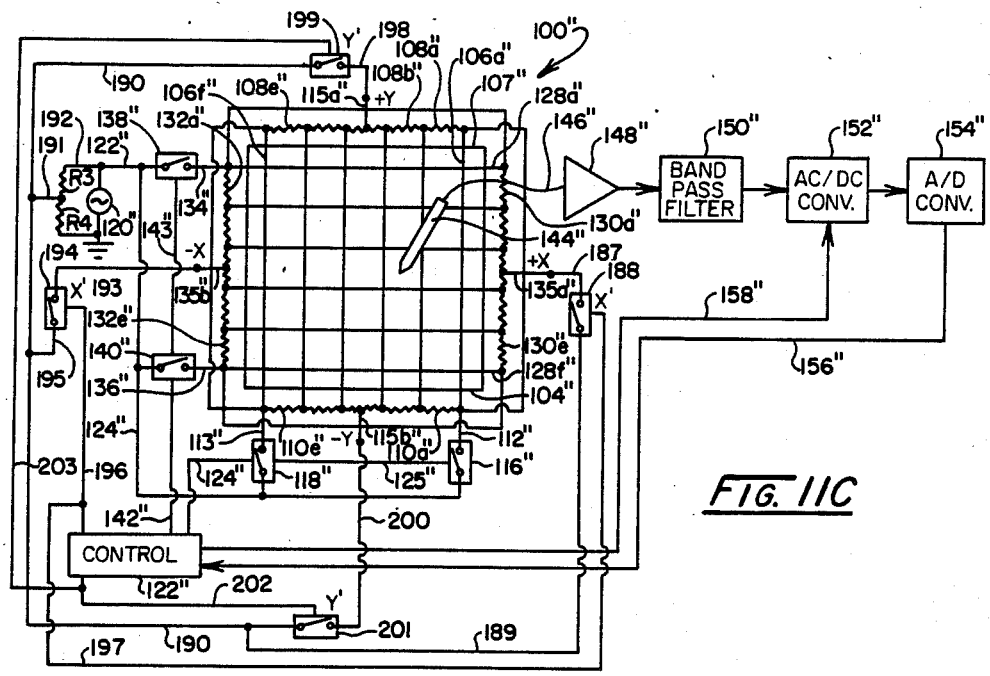
_FIG. 11C_

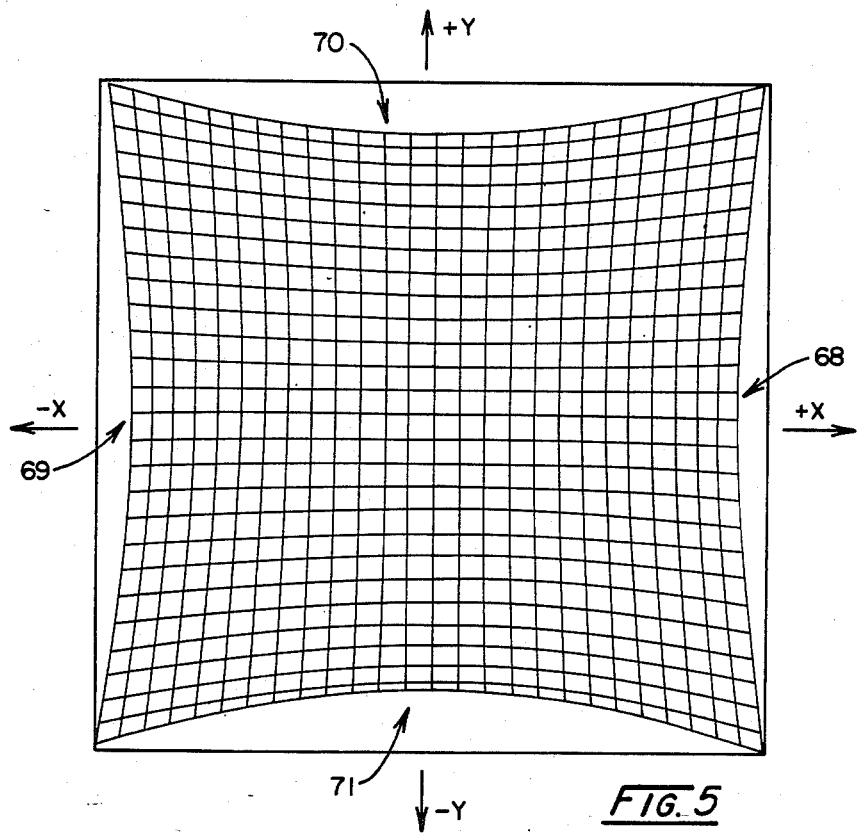
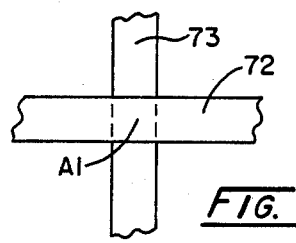
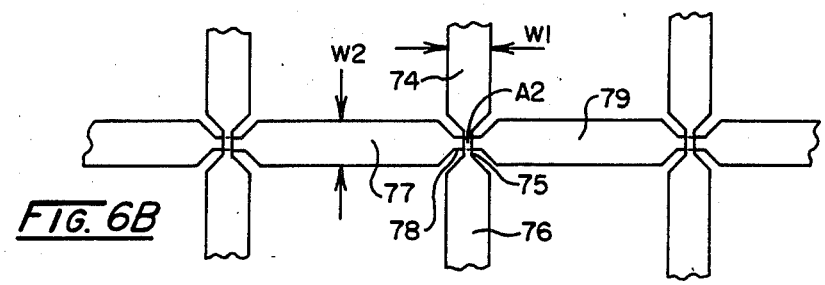

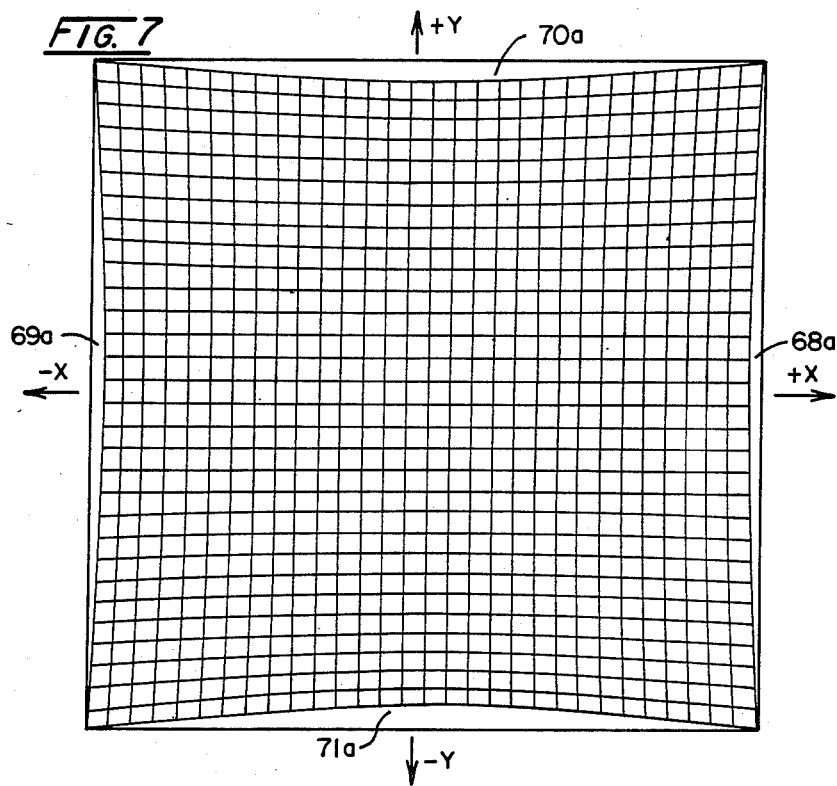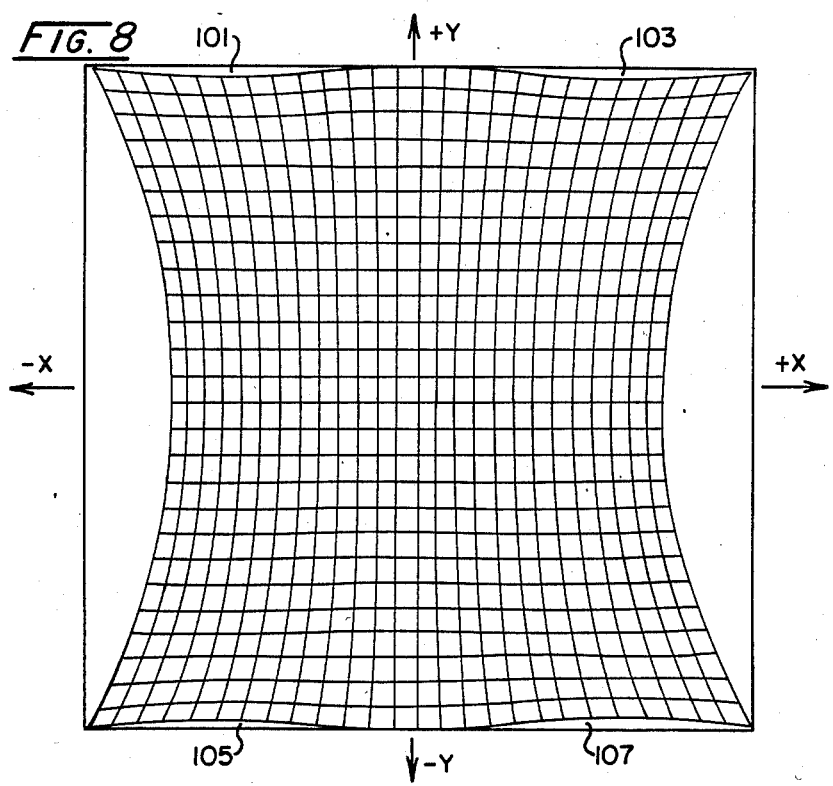

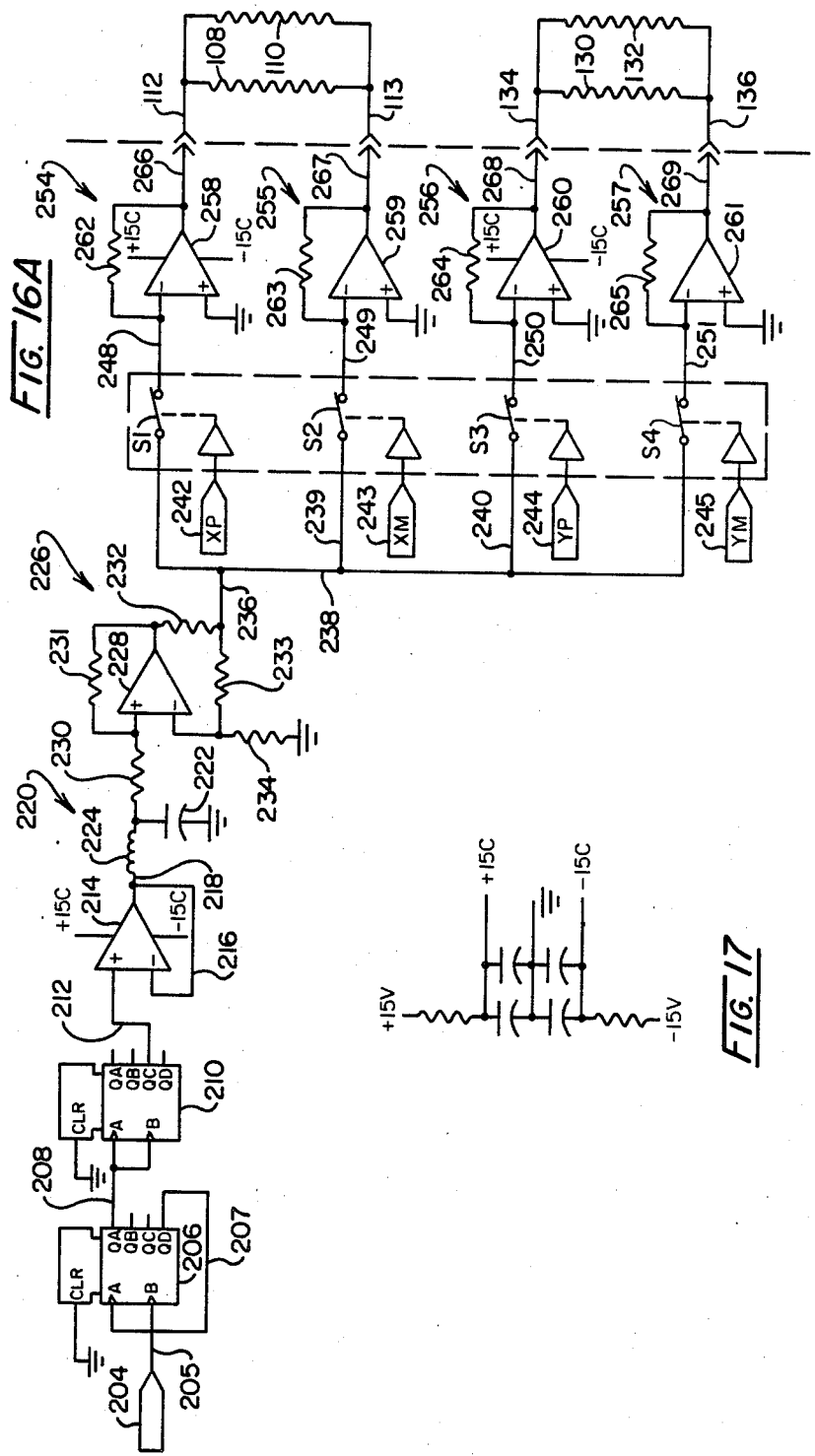

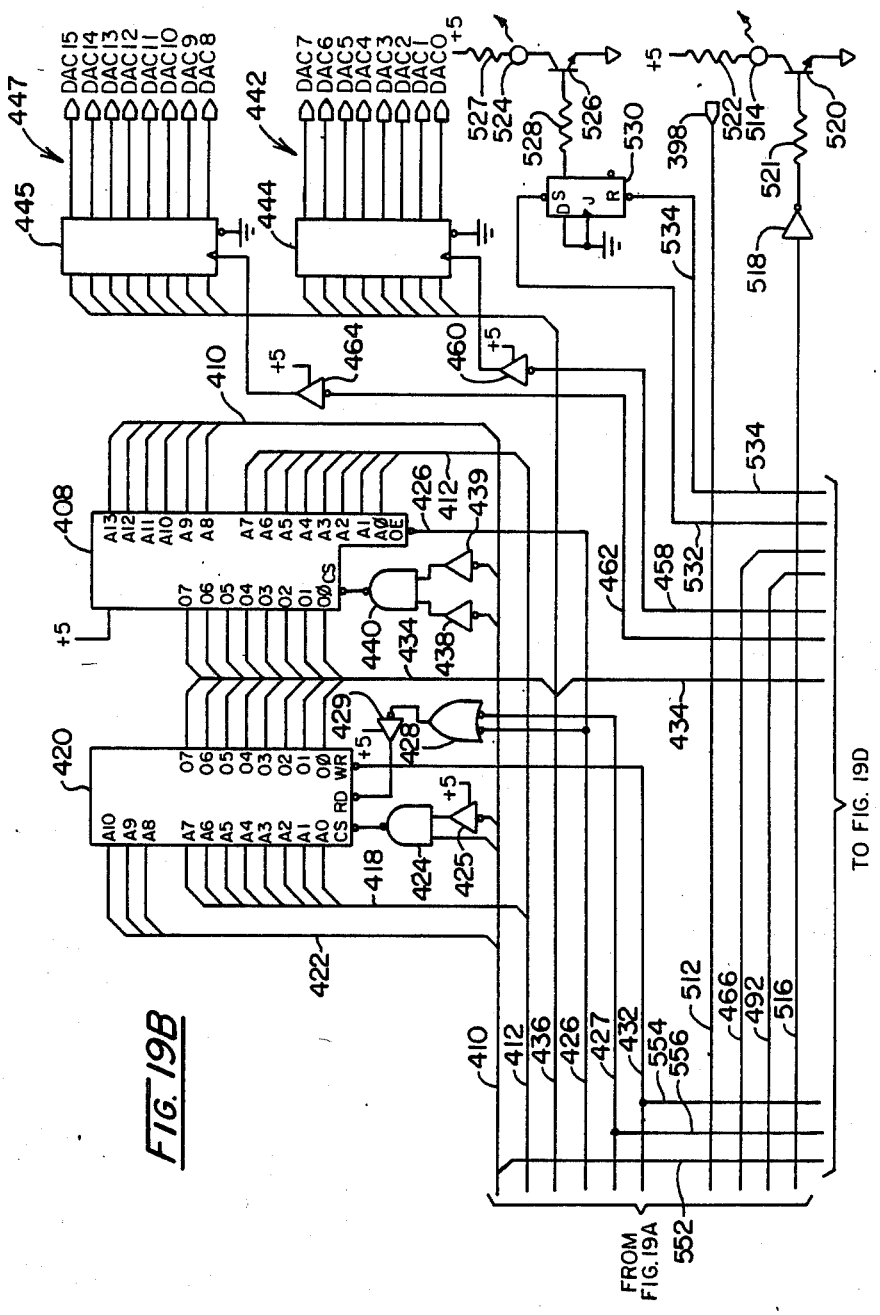

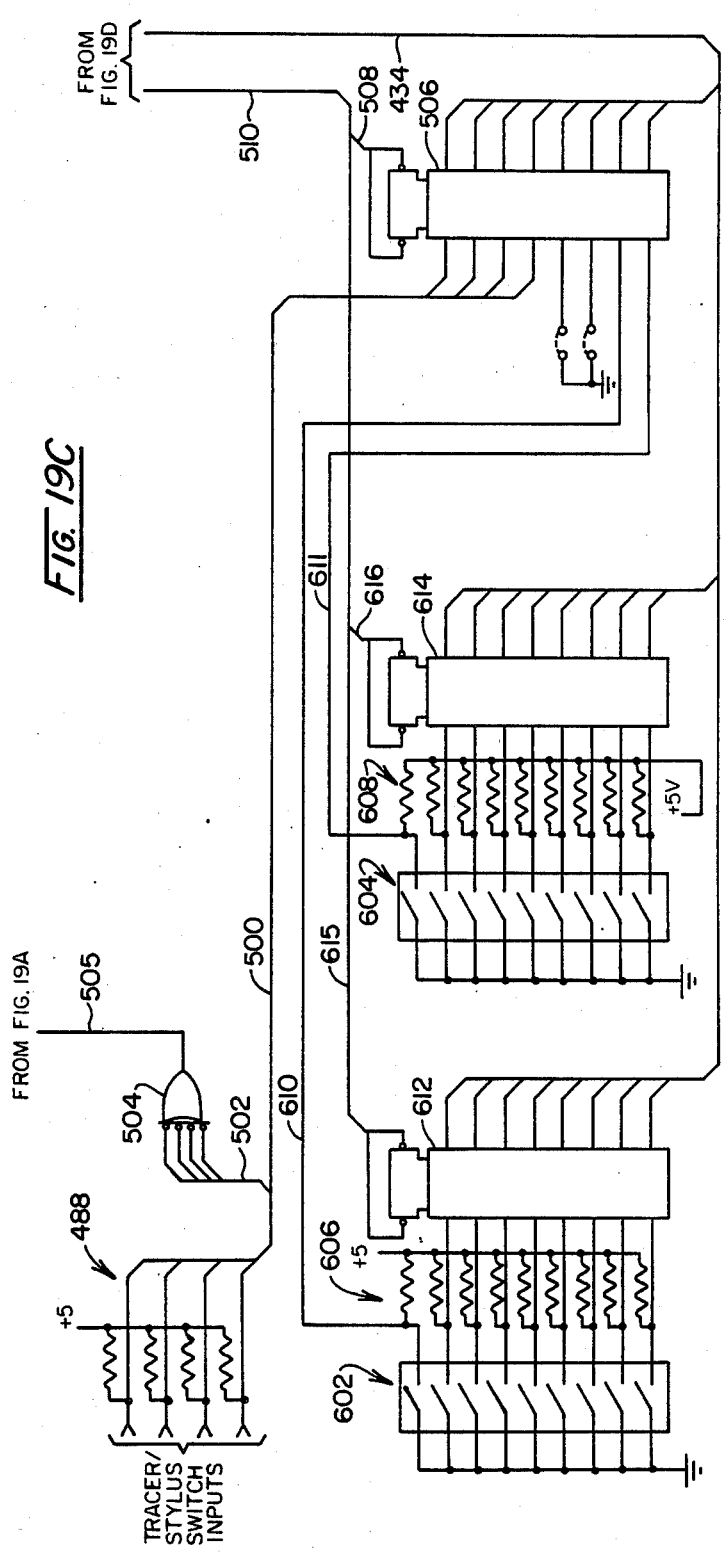

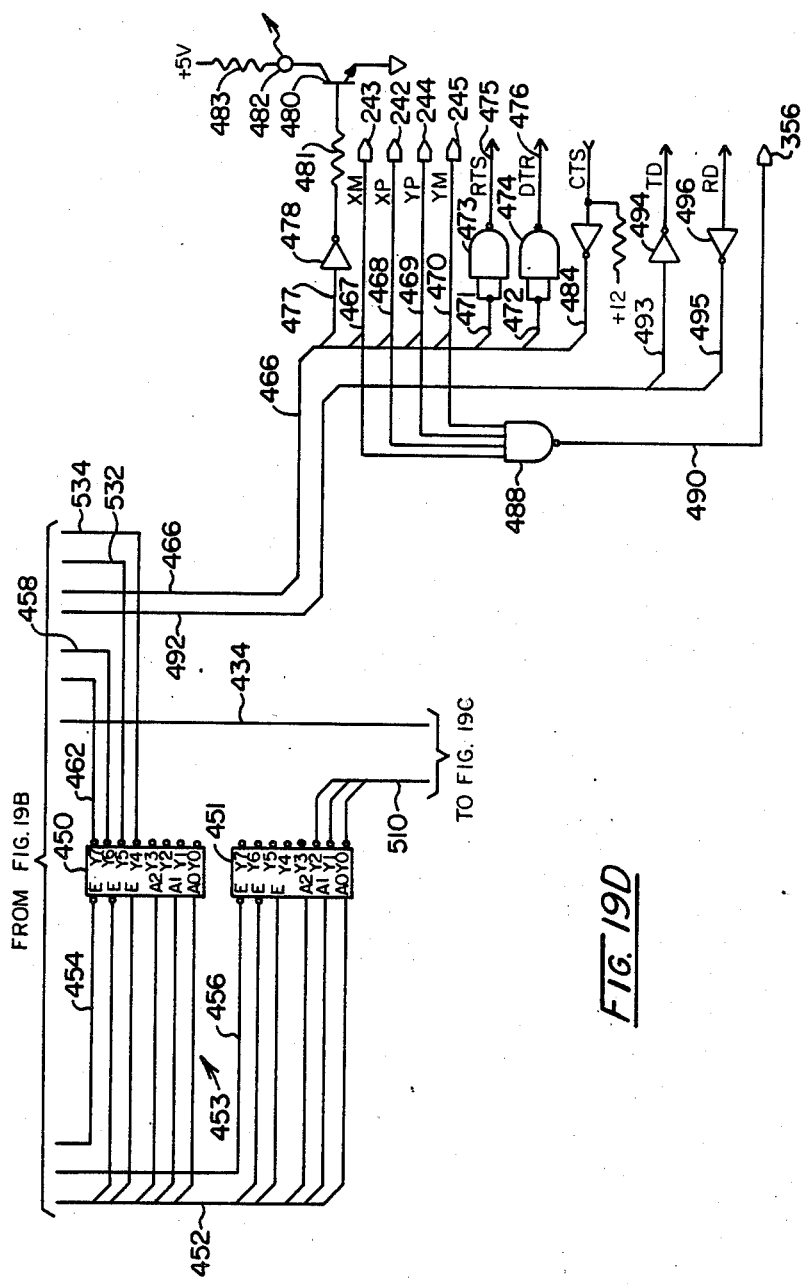

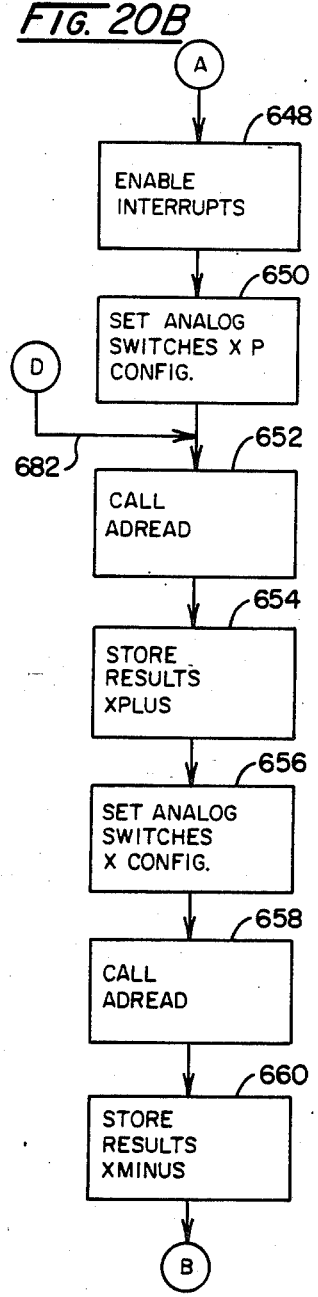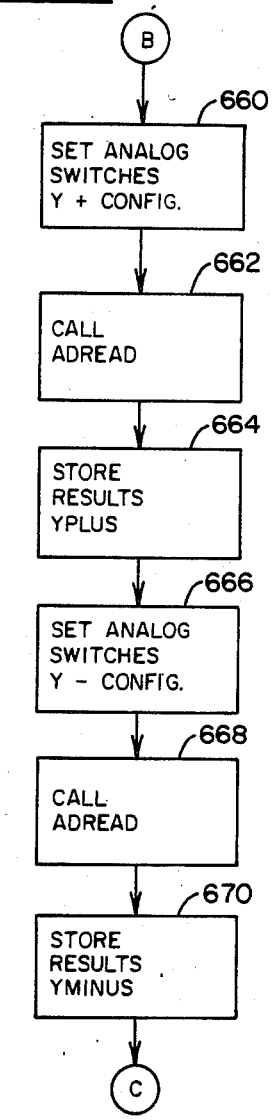

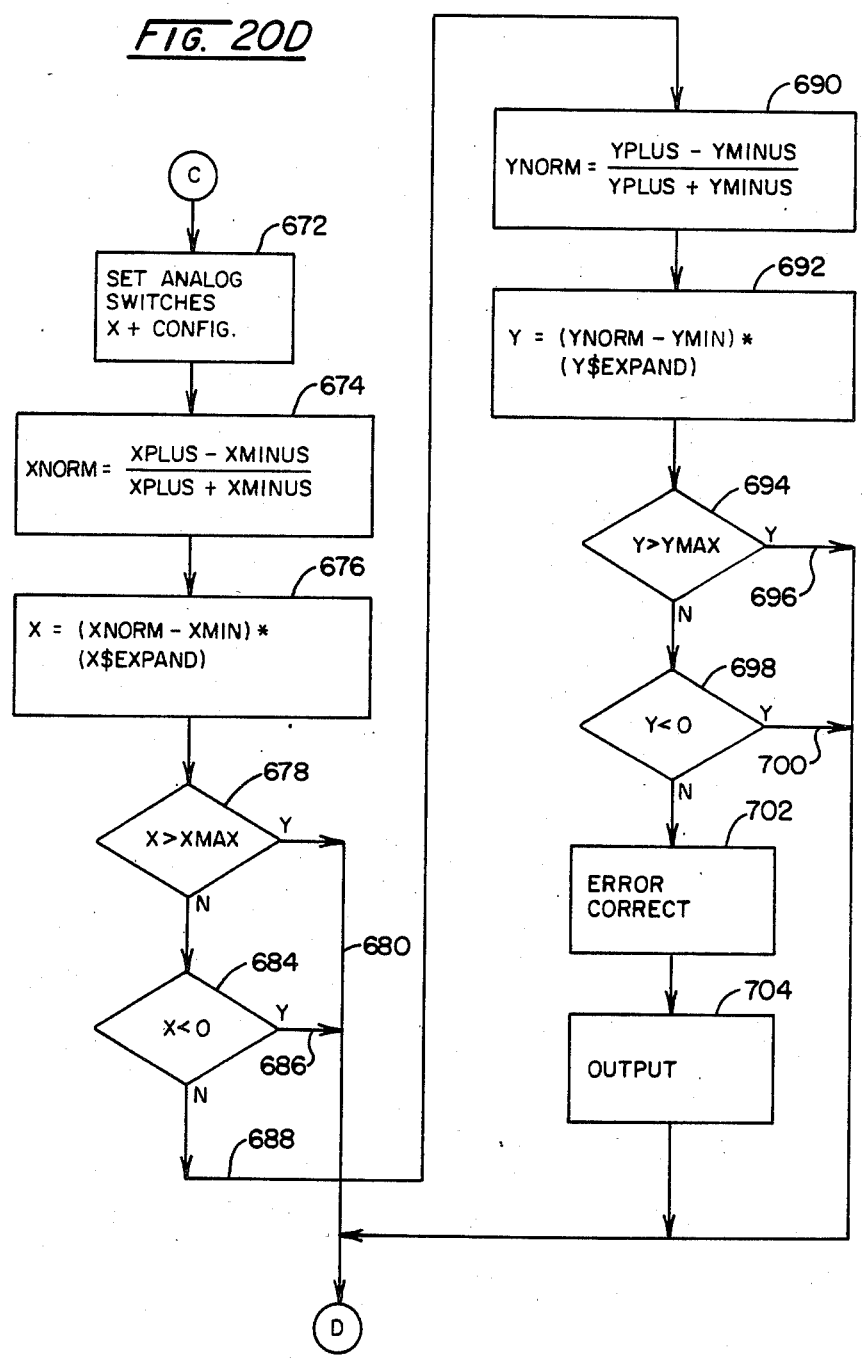

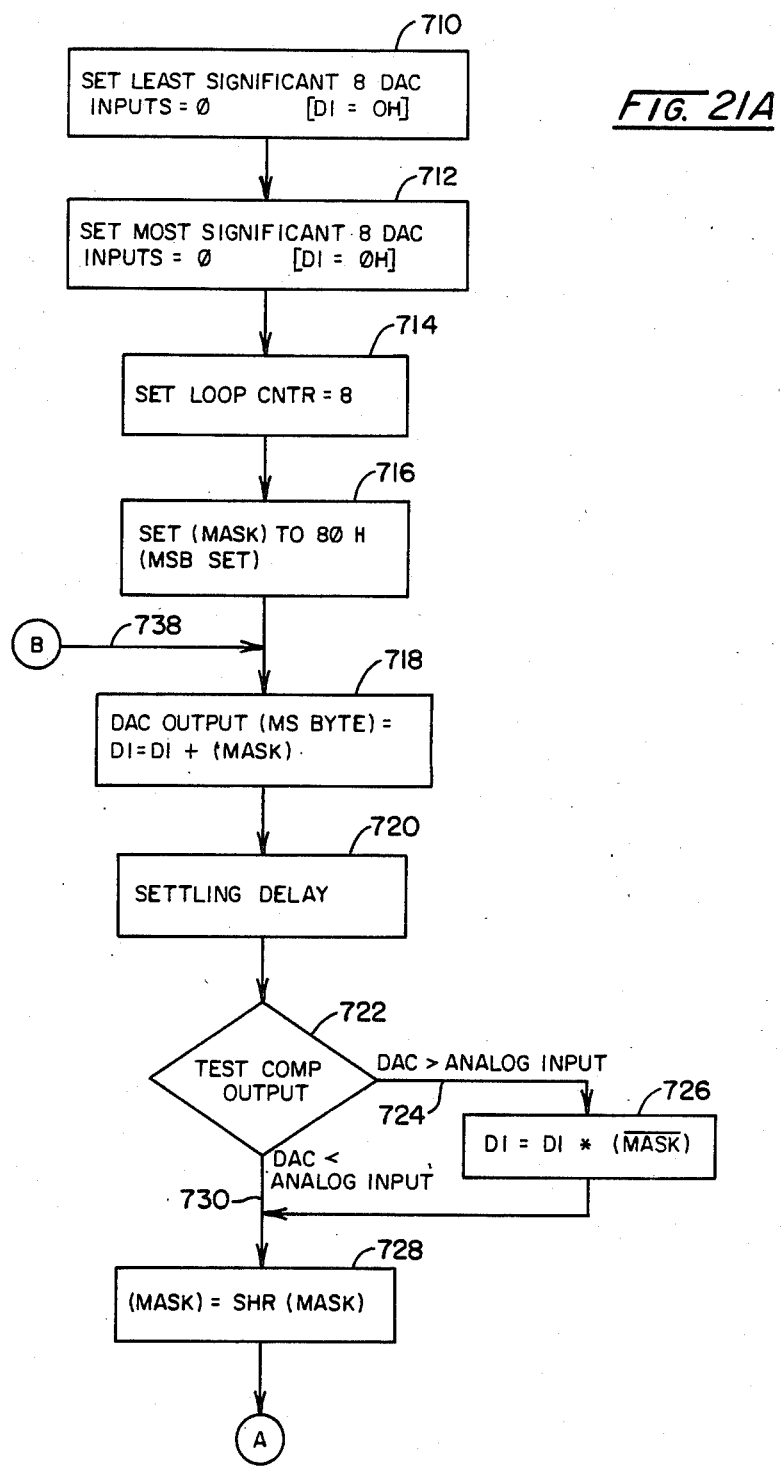

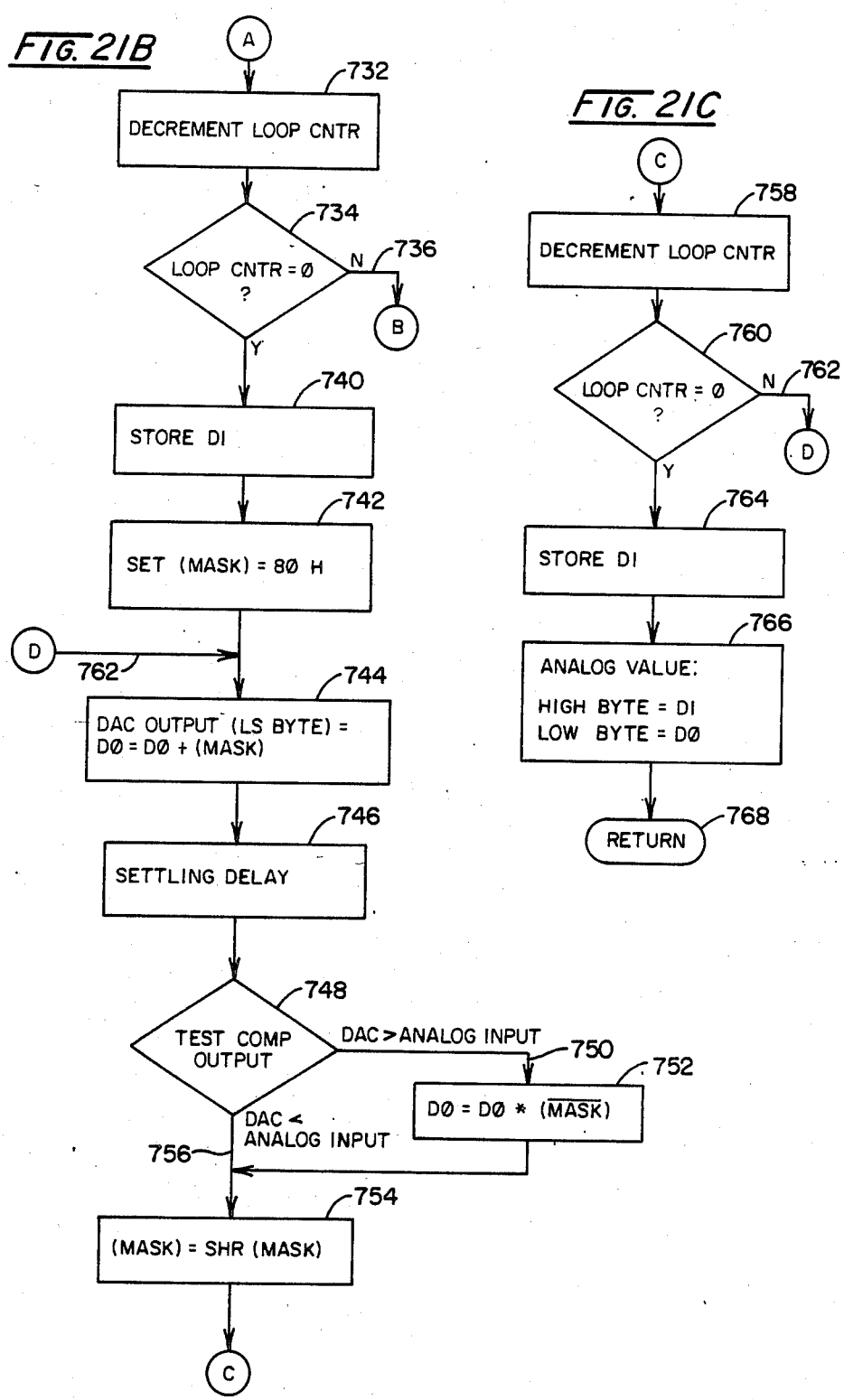

FIG. 23A

778 — COLLECT DATA SET FROM RESISTIVE MEASUREMENTS
$Rx(i)$ AND $Ry(j)$  $\quad i = 1$ to $n$
$\quad\quad\quad\quad\quad\quad\quad\quad\quad\quad j = 1$ to $m$

780 — COMPUTE $X(i)$ AND $Y(j)$ FROM DATA SET $$X(i) = \frac{\sum_{k=i+1}^{N} Rx(k) - \sum_{k=1}^{i+1} Rx(k)}{\sum_{k=1}^{N} Rx(k)}$$

$$Y(j) = \frac{\sum_{k=j+1}^{N} Ry(k) - \sum_{k=1}^{j+1} Ry(k)}{\sum_{k=1}^{N} Ry(k)}$$

782 — SET UP INITIAL CONDITIONS $i = 1$
$j = 1$ $i_{max}, j_{max}$ = SIZE OF X & Y CORRECTION TABLES DETERMINE  $X_{min}, X_{max}$
$\quad\quad\quad\quad\quad\quad Y_{min}, Y_{max}$ (A)

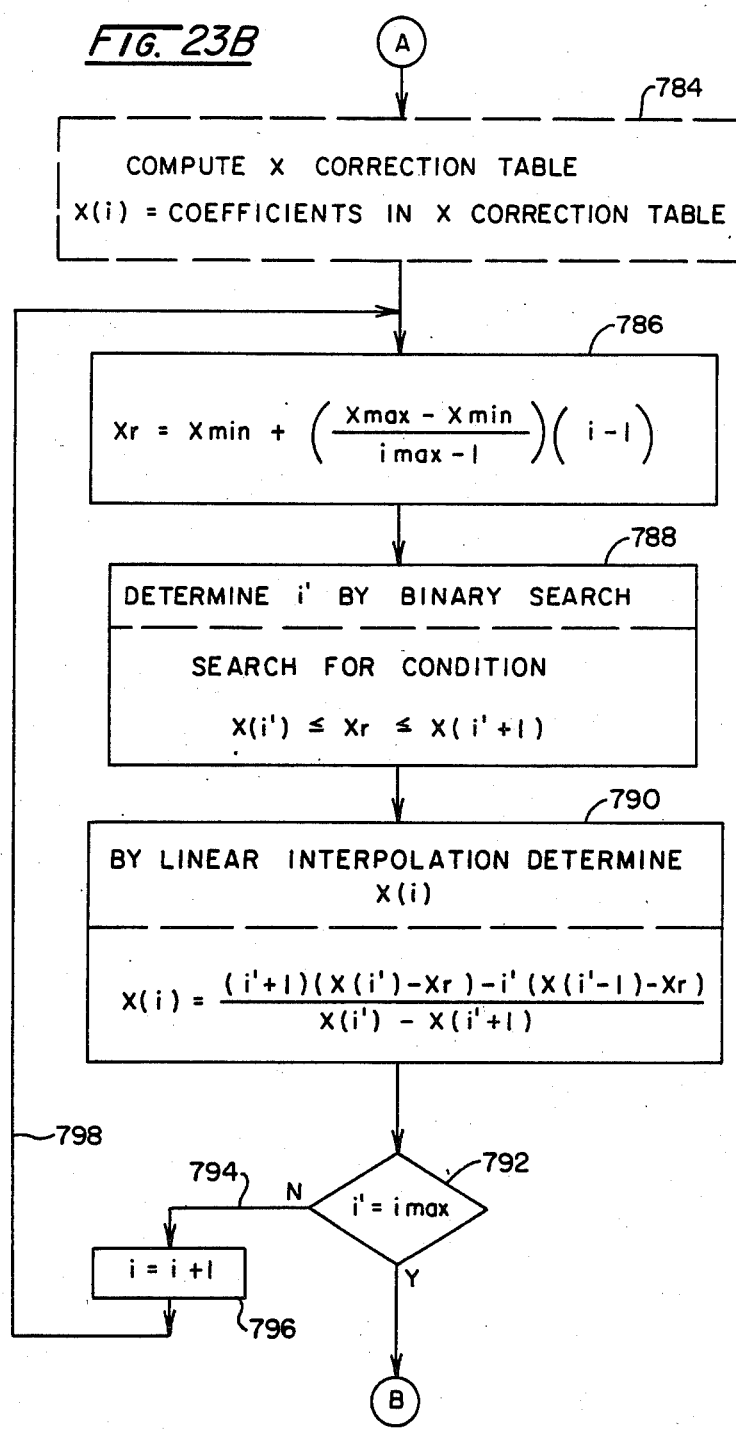

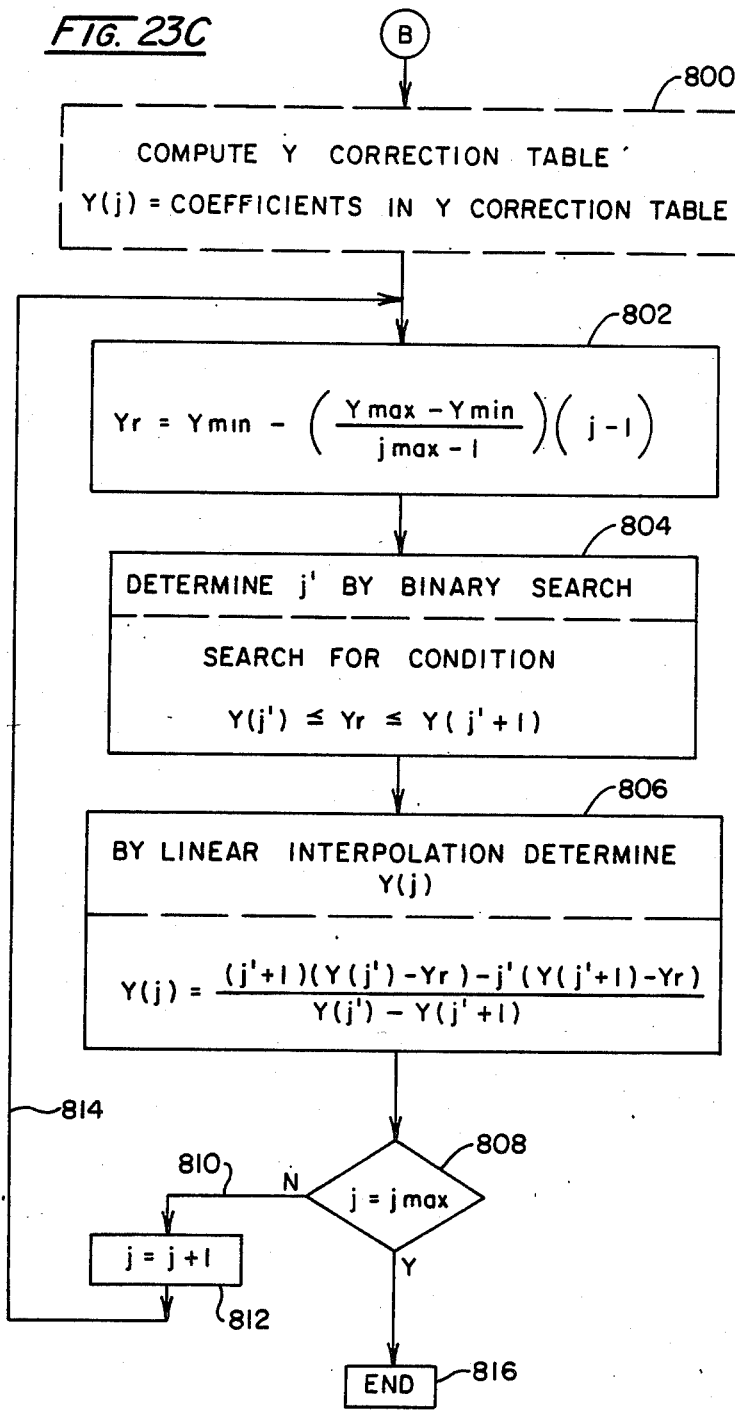

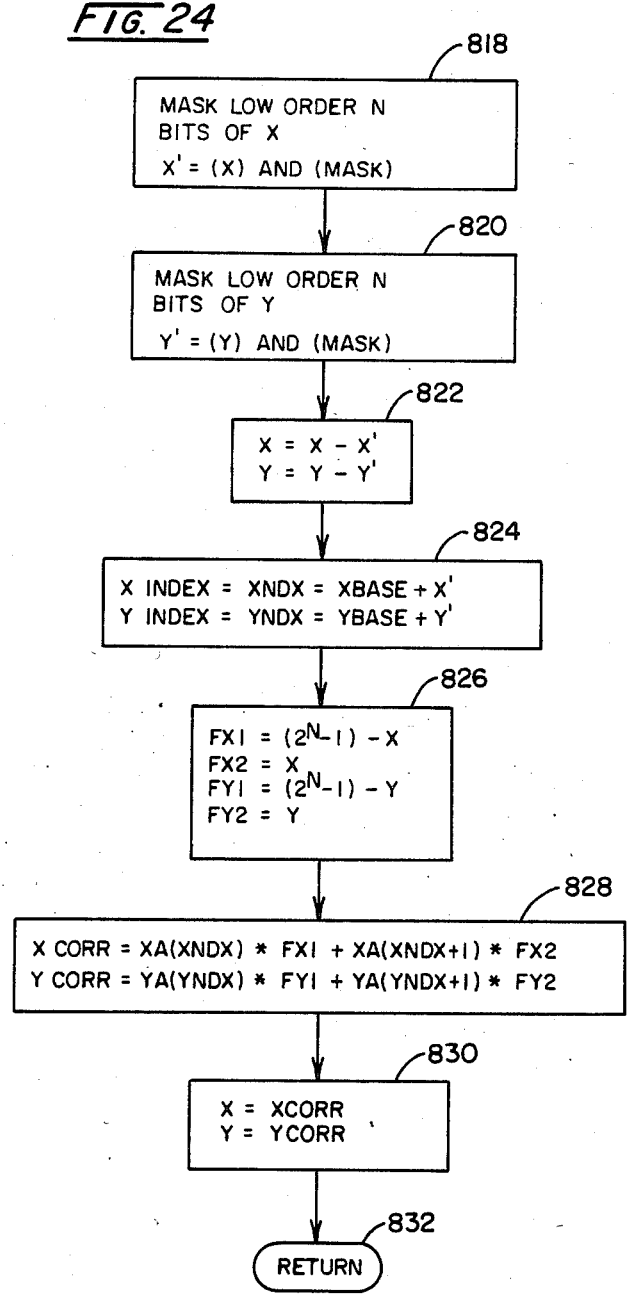

POSITION RESPONSIVE APPARATUS, SYSTEM AND METHOD HAVING ELECTROGRAPHIC APPLICATION

CROSS-REFEREMCE TO RELATED APPLICATION

This application is a continuation-in-part of U.S. application Ser. No. 791,324, filed Oct. 25, 1985, now abandoned, entitled "Position Responsive Apparatus, System and Method having Electrographic Application".

BACKGROUND OF THE INVENTION

Investigators have developed a variety of technical approaches to the generation of coordinate pairs of signals from electrographic devices. Industrial requirements for these devices are increasing concomitantly with the evolution of computer graphics, computer-aided design, and computer-aided manufacturing systems. Thus, a considerable degree of accuracy in pinpointing physical positions upon the surfaces of the digitizers is required for many applications. Other applications of the electrographic services include touch screen devices wherein the operator's finger or a stylus or the like is used to touch a portion of the accessing surface such that it emulates a key of a keyboard.

The operation of a digitizer or graphics tablet generally involves the same manual procedures as are employed in conventional graphics design, a stylus or tracer representing a writing instrument being drawn across or selectively positioned upon the position responsive surface of the digitizer. In turn, the electrographic device responds to the position of the stylus to generate paired analog coordinate signals which are digitized and conveyed to a host computer facility.

Early approaches to digitizer structures, for example, have looked to employing compostie structures wherein a grid formed of two spaced arrays of mutually orthogonally disposed fine wires is embedded in an insulative carrier. One surface of this structure serves to yieldably receive a stylus input which yielding causes the grid to read out coordinate signals. More recent and improved approaches to achieving readouts have been accomplished through resort to a capacitive coupling of the stylus or locating instrument with the position responsive surface to generate the paired analog coordinate signals. Such capacitive coupling can be carried out either with a grid layer which is formed of spaced linear arrays of conductors or through resort to the use of an electrically resistive material layer or coating.

An immediately apparent advantage of developing position responsive surfaces or digitizers having writing surfaces formed of a continuous resistive material resides in the inherent simplicity of merely providing a resistive surface upon a supportive substrate such as glass or plastic. Further, unlike conventionally encountered grid structures, the resistive coatings as well as their supportive substrates may be transparent to considerably broaden the industrial applications for the devices. For example, the digitizers may be placed over graphics or photographic material for the purpose of tracing various profiles.

A variety of technical problems have been encountered in the development of resistive coating type digitizer devices, one of which concerns the non-uniform nature of the coordinate readouts achieved with the surfaces. Generally, precise one-to-one cooorespondence or linearity is required between the actual stylus or tracer position and the resultant coordinate signals. Because the resistive coatings cannot be practically developed without local resistance (thickness) variations, for example of about ±10%, the non-linear aspects of the otherwise promising approach has required a considerable amount of investigation and development. Exemplary of such development is the border treatment or switching technique of Turner in U.S. Pat. No. 3,699,439 entitled "Electrical Probe-Position Responsive Apparatus and Method" issued Oct. 17, 1972, and assigned in common herewith. This approach uses a direct current form of input to the resistive surface from a hand-held stylus, the tip of which is physically applied to the resistive surface. Schlosser et al describes still another improvement wherein an a.c. input signal is utilized in conjunction with the devices and signal treatment of the resulting coordinate pair output signal is considerably improved. See U.S. Pat. No. 4,456,787 entitled "Electrographic System and Method", issued June 26, 1984, also assigned in common herewith. Position responsive performance of the resistive layer devices further has been improved by a voltage waveform zero crossing approach and an arrangement wherein a.c. signals are applied to the resistive layer itself to be detected by a stylus or tracer as described in U.S. Pat. No. 4,055,726 by Turner et al. entitled "Electrical Position Resolving by Zero-Crossing Delay" issued Oct. 25, 1977, and also assigned in common herewith. Substantially improved accuracies for the resistive surface type digitizer devices have been achieved through a correction procedure wherein memory retained correction data are employed with the digitizer such that any given pair of coordinate signals are corrected in accordance with data collected with respect to each digitizer resistive surface unit during the manufacture of the digitizers themselves. With such an arrangement, the speed of correction is made practical and the accuracy of the devices is significantly improved. The correction table improvements for these services is described, for example, in application for United States patent, Ser. No. 664,980, filed Oct. 26, 1984, by Nakamura et al. and assigned in common herewith as well as in application for United States Pat. Ser. No. 742,733, entitled "Electrographic System and Method," filed June 7, 1985, by Nakamura et al. and assigned in common herewith.

Compacitive coupling using a stylus or locating device has been employed with grid layers which are formed as adjacent but spaced-apart arrays of elongate thin conductors. For example, these grid conductors may be provided as lines of silver ink deposited in orthogonally disposed relationships upon the opposite faces of a sheet of insulative material such as Mylar. As described in Rodgers et al., U.S. Pat. No. 4,492,819, issued Jan. 8, 1985, this grid surface may be employed with a stylus which injects an a.c. signal capacitively at the surface thereof. To detect this signal, a ladder form of resistance network is employed with each of the conductor arrays such that a predetermined resistance is coupled between each conductor from first to last and a discrete resistor is coupled from the union of two successive resistors to ground. Generally these devices operate in a current mode such that current values are determined at the peripherally disposed resistor strings. As is apparent, because of the necessity of employing a conductive form of grid line, these devices are limited to opaque position responsive surface applications. While discrete matched resistors are required to couple the grid line nodes, a conductive or carbon loaded ink advantageously may be employed to provide the grid-to-grid resistive components of the unit, however, at the expense of a resistance value deviation for each discrete increment of resistance between adjacent parallel grid lines.

Investigations have determined that there are operational trade-offs occasioned with the various design approaches to grid-type digitizers. For example, where a.c. signals are injected from the stylus into a passive orthogonal grid, the grid structured surface electrically appears as a high impedance to the stylus or pick-up. Thus, the presence of moisture at the tablet or digitizer surface will cause severe inaccuracies. Further, this type device is prone to react adversely in terms of readout accuracy to slightly conductive materials including certain forms of paper.

On the other hand where the grid-type digitizers are excited by a.c. signals emanating from the peripheral resistor strings or multi-nodal stripes, a potential gradient is established for coordinate identification. The stylus or pick-up, in turn, receives analog coordinate signals in an arrangement desirably immune from hand effects, moisture effects and the like. However, the linearity of these devices becomes severely impaired to essentially negate the advantages otherwise sought.

Where it is desired to provide the above-noted grid structures in a transparent embodiment for a digitizer, limitations may be observed. To achieve transparency of the grid lines themselves, a transparent material must be employed, for example an indium tin oxide. These materials, however, may exhibit an impedance or resistivity which establishes a finite resistance between the oppositely disposed ends of a tablet or position responsive surface. Such finite resistance, unless accommodated for, will impose debilitating error unless somehow corrected. The finite resistance further may impose ambiguities within the system such that a voltage at one position along one trace or grid line will occur in equal value at a different location in another grid line. A practical implementation, therefore, of grid type tablets requires a minimization of the chance of occurrence of such ambiguities.

SUMMARY

The present invention is addressed to a position responsive system apparatus and method having application in the field of electrographics wherein grid arrays of elongate, thin parallel and mutually spaced grid elements are located upon an insulative substrate to define mutually orthogonally disposed coordinate defining surfaces. Voltage gradients are developed across the grids through the employment of resistor chains or their equivalent which are excited in the vicinity of the first and last grids of each of the arrays. Because it is somewhat impractical to provide necessary uniformity in resistance values between each grid element of these resistor chains or equivalent thereof, the inventive apparatus and method evaluates these discrete resistances off-line or during the manufacture of the devices. A look-up table then is generated with corrective information which the microprocessor based control system of the devices may then call upon to develop accurate coordinate pair information with relative simplicity.

Another feature of the invention looks to a structuring of the grid elements of the grid arrays such that a significant dimunition of capacitive coupling at grid cross-over regions is realized. This is carried out by "necking down" the grid elements at their regions of cross-over. Additionally, the regions leading to the necked-down portions are made wider to accommodate for the loss of material and an alteration in the widthwise extent of the grid element stripes is provided to accommodate for the greater distance of that grid which is spaced furthest from the working surface upon which the cursor or locating device is maneuvered. Linearity improvements also are achieved by providing additional taps or terminals intermediate the outboard terminals normally used to drive the resistive strips or resistor chains along the borders or peripheries of the grid arrays. By so grounding these intermediate points, the leakage currents occasioned by the capacitive coupling between grid element arrays are diverted before any significant set-off voltage build-up can occur. As a consequence, improvements in grid performance are demonstrated. In addition to providing for disposal of leakage currents through intermediate grounding techniques, an attenuated proportionate parallel drive of the tablet excitation also is provide in one embodiment.

Another aspect of the invention involves the provision of such grid arrays with transparent materials such as indium tin oxide. Because grid elements formed of such materials exhibit a finite resistance from border to border, conventional excitation techniques which have generally been employed at one border only, develop substantial errors. With the instant invention, excitation takes place through oppositely disposed parallel resistor chains coupled with each grid element array. As a consequence, significant reductions in error are realized.

As still another aspect of the invention, a technique for switching excitation current into the arrays of grid elements is employed wherein the excitation signals are applied to the switching components in current form. Voltage follower stages which produce a voltage characterized output excitation signal when the switches have a closed orientation and a ground output when the switches have an open orientation are employed. With the arrangement, considerable improvements in production costs and efficiencies are realized.

The invention, accordingly, comprises the apparatus, system and method possessing the construction, combination of elements, steps, and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIGS. 1A–1C are schematic portrayals of embodiments of electrographic apparatus according to the invention showing the general features thereof;

FIG. 5 is a grid plot developed by taking data points every 0.45 inch along a digitizer tablet without the corrective features of the instant invention;

FIG. 6A is a partial schematic top view of a grid element structure of the prior art;

FIG. 6B is a partial schematic top view of a grid element design according to the invention;

FIG. 7 is a grid plot developed in similar fashion as that of FIG. 5 but with grid element geometric correction according to the invention;

FIG. 8 is a grid plot developed as in FIG. 5 but using an intermediate terminal drive and grounding approach according to the invention along one coordinate direction;

FIGS. 11A-11C are schematic portrayals of additional versions of the electrographic apparatus of the invention showing resistive chains about all borders of the position responsive surfaces thereof;

FIGS. 16A-16C are schematic diagrams of excitation drive circuits employed with the apparatus of the invention;

FIG. 17 is a circuit diagram of a decoupling network employed with the apparatus of the invention;

FIGS. 19A-19D combine to form a circuit diagram showing the microprocessor driven control employed with the apparatus of the invention;

FIGS. 20A-20D provide a flow chart of the general program under which the microprocessor drive of the invention may perform;

FIGS. 21A-21C are a flow chart describing an ADREAD control routine;

FIGS. 23A-23C are a flow chart describing a technique for developing an error correction look-up table for employment with the electrographic apparatus of the invention; and FIG. 24 is a flow chart of a routine utilized to carry out error correction in conjunction with a memory retained correction table developed in accordance with the flow chart of FIGS. 23A-23C.

DETAILED DESCRIPTION

Figure 1A:
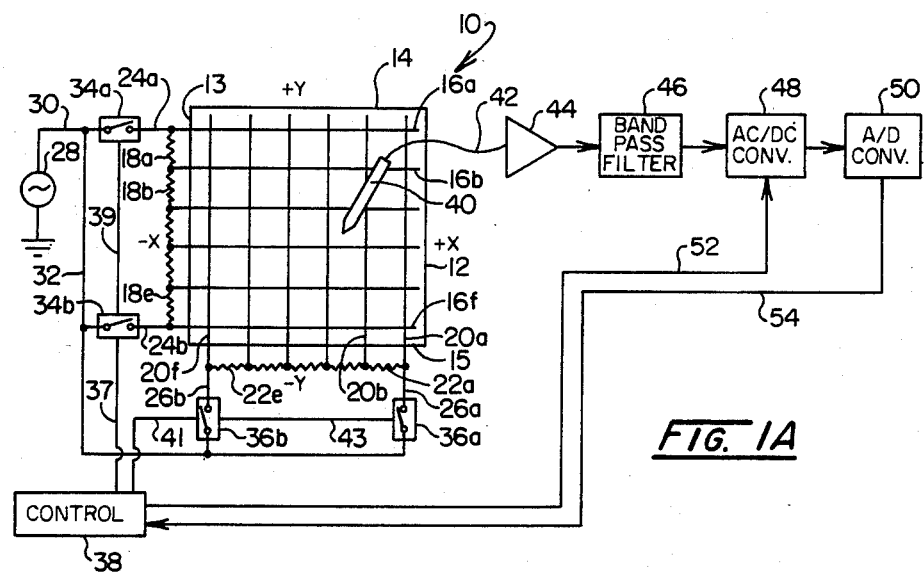

The electrographic apparatus of the present invention may be implemented as either an opaque or a transparent position responsive grid-type surface. As noted above, the transparent surface approach advantageously permits a more flexible range of applications and is generally preferred. Thus, any opaque grid surface or tablet implementation necessarily is one looking to lower fabrication costs while retaining necessary coordinate definition accuracy. Looking to FIG. 1A, opaque implementation of a position responsive surface is represented as including a square shaped digitizer tablet 10. Represented schematically in the interest of clarity, the tablet 10 is shown having +x and −x borders, respectively, at 12 and 13 along with orthogonally disposed corresponding to +y and −y borders 14 and 15. Generally, the borders 12-15 will be employed with an insulative supportive structure such as a thin plastic or glass, typically a Mylar shet having a 0.015 inch thickness is used. One surface of this structure serves to support an array of elongate thin, parallel grid elements, for example, in the x-coordinate direction extending between borders 12 and 13 and represented at 16a-16f. These elements will be formed of a conductive material, usually, an ink-like substance formed of silver and a binding polymer which may be applied at relatively low cost on the supportive substrate surface. Typically, the grid elements, without the corrective features described herein, will have a width of 0.050 inch and have a center-to-center spacing of 0.200 inch. Adjacent border 13, the grid elements 16a-16f are coupled at discrete nodes with a sequence of voltage gradient defining resistors 18a-18e. Each of these resistors 18a-18e, in theory, should be provided having identical resistance values.

The opposite surface of the insulative substrate supporting grid arrays 16a-16f serves to support an orthogonally disposed y-coordinate grid array including elements as at 20a-20f. Structured identically as the x grid array of elements 16a-16f, the y-coordinate array of elements is coupled adjacent border 15 with discrete voltage gradient defining resistors 22a-22e. As before, these resistors, in theory, should be selected having identical resistance values. The x- and y-coordinate grid elements are shown excited alternately through their respective terminals 24a-24b and 26a-26b which are seen to be located at the oppositely disposed outer ends of the respective resistor chains 18a-18e and 22a-22e, i.e. adjacent the first and last grid elements of each array. Excitation is schematically represented as emanating from a source 28 which may provide a frequency selected within the range of about 60 KHz to 140 KHz (100 KHz typically being selected) and which is applied in an alternating fashion via lines 30 and 32 to the switching functions represented at 34a-34b for +y, −y activation and at switching functions 36a-36b for +x, −x activation. The switching functions 34a-34b and 36a-36b will be seen to provide a ground input, or effective zero voltage to an associated terminal when open and to apply the a.c. excitation source when closed. Control over the switches is microprocessor based and is represented generally as including control block 38 from which extend control functions represented by lines 37, 39, and 41, 43. Control 38 functions to actuate the switches 34a-34b and 36a-36b in a sequence wherein +x information is achieved by applying excitation current at terminal 26a and ground at terminal 26b, following which switching logic is reversed to apply excitation current at terminal 26b and ground at terminal 26a to develop −x information. During this interval, the y-coordinate grid arrays are held at ground by virtue of the open status of switches 34a and 34b and thus develop a form of ground plane.

Following the development of x-coordinate information, y-coordinate information is similarly generated by the initial application of excitation source current through terminal 24a while holding terminal 24b at ground and then reversing this procedure. Following appropriate signal treatment and digitization, the information is subjected to a ratio operation to achieve coordinate pair information. During the excitation modes, coordinate pair information is picked up by a locator or stylus 40 which is hand-held by the operator and capacitively coupled into the tablet 10 working surface. The output of stylus 40 is coupled via cable 42 to a signal treatment circuit including a pre-amplification function as represented at 44, a band pass filter as represented at block 46, an a.c. to d.c. conversion stage as represented at block 48, and a conversion of the resultant d.c. level to a digital signal as represented at block 50. The a.c. to d.c. conversion stage is under the control of microprocessor based control 38 as represented by line 52, while the digital conversion stage 50 is shown under similar control as represented at line 54.

Figure 2:
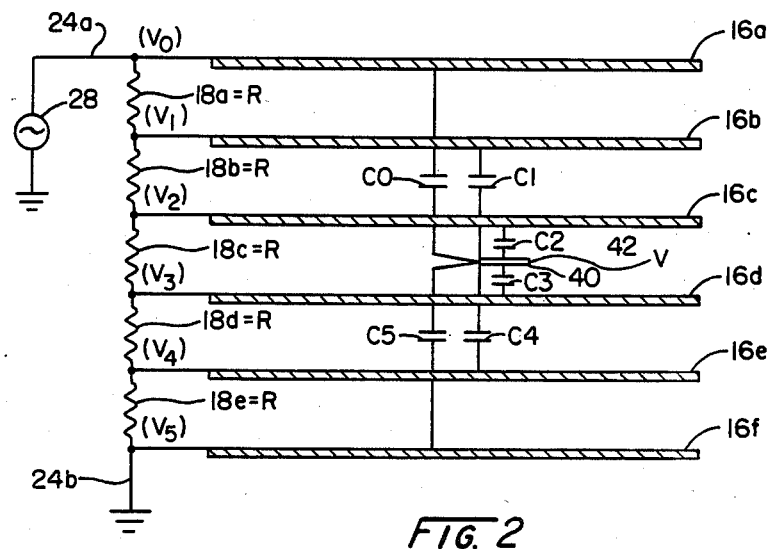
FIG. 2 is a one-dimensional diagrammatic representation of the grid element structure of the position responsive surface of FIG. 1.

Theoretical performance of the digitizer tablet 10, as thus described, may be evaluated in conjunction with the one-dimensional portrayal thereof as shown in conjunction with FIG. 2. In that figure, the y-coordinate grid lines $16a-16f$ are reproduced in conjunction with corresponding resistors $18a-18e$ and terminals $24a-24b$. The a.c. voltage source 28 is reproduced and is shown in functional association with terminal 24a, terminal 24b being shown coupled to ground. Each of the resistors $18a-18e$ is assigned an identical resistance value R, while the nodes of the grid line-resistor chain are identified by the voltage valuations thereat $V_0-V_4$. The stylus 40 is reproduced along with the cable 42 leading to an output voltage identified as V. Stylus 40, representing a capacitive pick-up, will recognize an equivalent capacitance represented by the capacitor symbols identified at $C_0-C_5$. With the symbolic arrangement thus shown, the following relationships will obtain:

$$V_1-V_2=V_2-V_3=V_3-V_4=V_0-V_1 \quad (1)$$

V (at stylus
$$40)=V_0 \cdot C_0/C_{eq}+V_1 \cdot C_1/C_{eq}+V_2 \cdot C_2/C_{eq}+ \ldots V_n \cdot C_n/C_{eq} \quad (2)$$

where $V_n$ is the voltage on the nth conductor and $C_n$ is the effective coupling capacitance between the pick-up or stylus 40 and the nth conductor and $C_{eq}$ is the total equivalent capacitance which may be represented as:

$$C_{eq} = \sum_{i=1}^{n} Ci \quad (3)$$

Although a voltage gradient is developed which has discrete voltage steps with the arrangement shown, a continuous voltage function is developed at the stylus 40. This holds inasmuch as $V=f(C_1, C_2, C_3 \ldots C_n)$ and the $C_n$ elements are continuous. In generating a voltage gradient across the tablet or digitizer 10 in the manner described, the linearity of the output, in theory, is solely a function of the resistors $18a-18e$ and the extent to which they match one another. A "cross-talk" phenomena evolved by capacitive coupling at overlapping grid element intersections must be accommodated for, however, as discussed in detail later herein. The above analysis also looks to grid elements which are of somewhat low resistance such as are formed of silver ink or the like. Where a transparent embodiment is envisioned, then some error will enter the analysis as described later herein.

Figure 3:
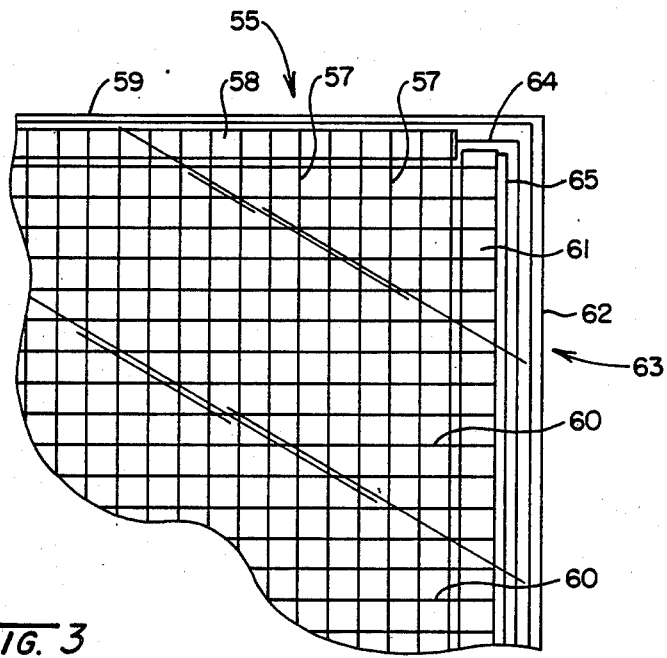
FIG. 3 is a partial schematic view of the grid structure of the electrographic apparatus of the invention showing resistive strips along the borders thereof.
Figure 4:
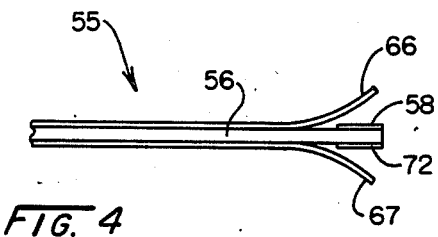
FIG. 4 is a partial cross-sectional view of the structure of FIG. 3.

Referring to FIGS. 3 and 4, a typical implementation of the above tablet is represented generally as a digitizer tablet 55. Tablet 55 is configured having a Mylar supportive substrate 56 upon which a vertically oriented array of a silver polymeric ink lines or strips 57 (grid elements) are silk screened. Grid elements 57 are shown merely as lines for the instant discussion. However, their actual shape will be seen to be quite novel. Note that the elements 57 terminate at and are electrically connected at "nodes" with a continuous resistive band or strip 58 positioned adjacent a border 59 of the tablet. Band or strip 58 may be provided, for example, as a carbon loaded ink which is deposited over the substrate 56. In similar fashion an array of orthogonally oriented grid elements 60 is shown extending along the opposite side of the substrate 56 for connection at nodes with another resistive band or strip 61 adjacent border 62 of the tablet 55. As in the case of grid elements 57, elements 60 will be seen to have a novel structuring. Appropriate leads and the like leading to the resistive bands are shown in the lead array 63. It may be observed in the latter regard, that resistive band 58 is shown having a terminal connection at 64, while resistive band 61 is shown having a terminal input at 65. To protect the grid arrays at either side of the substrate 56, protective opaque plastic covering may be provided as shown in FIG. 4 at 66 and 67. These coverings may be glued in place with a suitable glue and themselves, of course, are opaque. The protective coverings 66 and 67 may, for example, be provided as a Mylar sheet having a thickness of about 0.005 inch. The assemblage 55 is mounted upon a support structure providing rigid support and serving to further enclose circuitry and the like.

In the discussion concerning FIG. 1A above, the insertion of an excitation current has been observed to occur through the grid arrays of the tablet 10 itself as opposed to being injected capacitively through the stylus 40. By so exciting the grid arrays themselves, it becomes necessary to operate in two modes, one mode exciting the x-coordinate grid element array and a next mode exciting the y grid element array. During the excitation of one such array, the other is held at ground preferably employing a multi-terminal technique. Because the grid arrays of the tablet are excited as opposed to the stylus 40, a significant improvement in its signal-to-noise ratio categorized performance is achieved. In this regard, the stylus or pick-up 40 will be coupled to a signal treatment network which, ideally, is of high impedance. Capacitive coupling into such a high impedance detection arrangement results in a loss of very little of the pick-up signal. Of course, an opposite situation obtains in the event that excitation occurs through the stylus 40 into the grid arrays of the tablet. To achieve a high degree of practicality and accuracy of readout for the tablet 10, the control function 38 will be seen to incorporate a memory having a look-up table with corrections for deviations of resistance value from node to node of a given grid element array. Thus, the rather simply applied resistive strips may be used without foregoing the linearity of performance theoretically achieved with perfectly matched internodal resistors. Because this memory retained table is developed during manufacture, the microprocessor driven control system is capable of operating at adequately rapid speeds during the on-line performance of the digitizer system.

The technique by which the control 38 treats the digitized signals once obtained, preferably is carried out as a difference/sum ratio. In this regard, assuming that the coordinate system described in conjunction with FIG. 1 develops signals which range arbitrarily from +1 to −1 in both the x- and y-coordinate direcitons, a signal representing any given coordinate (x, y) pair can be determined by measuring the voltage value pick-up by the stylus 40 under a procedure where the alternating voltage source 28 initially is applied to one terminal, for example terminal 26a in an x+coordinate orientation while ground reference is applied to the oppositely disposed terminal 26b. This procedure then is reversed for the x-coordinate direction and the combined readings may be used to determine one coordinate. A second mode then is entered where the same procedure is carried out in the opposite coordinate or y-coordinate sense. For example, arbitrarily designating the output of stylus 32 to be XPLUS when an alternating current source is applied to terminal 26a while simultaneously ground applied to terminal 26b; arbitrarily designating XMINUS to be the signal at stylus 40 when the opposite condition obtains wherein the alternating current source is applied to terminal 26b and ground is applied to the oppositely disposed terminal 26a; designating YPLUS to be the signal at stylus 40 when the alternating signal source is applied to terminal 24a and ground is applied to terminal 24b; and designating YMINUS to be the signal derived at stylus 40 when the alternating current source is applied to terminal 24b and ground is applied to terminal 24a, the following difference/sum ratio may be derived:

$$\text{position } x = \frac{(X\text{ PLUS}) - (X\text{ MINUS})}{(X\text{ PLUS}) + (X\text{ MINUS})}$$

$$\text{position } y = \frac{(Y\text{ PLUS}) - (Y\text{ MINUS})}{(Y\text{ PLUS}) + (Y\text{ MINUS})}$$

Referring to FIG. 5, an x-y plot is provided which represents the coordinate signals developed by a computer with a graphics tablet system performing as described in conjunction with FIG. 1A having regularly dimensioned grid elements arranged in x-y arrays in an 11.7"×11.7" format. Data points were taken with a locator every 0.45 inch in a rectangular grid pattern on the physical tablet itself. The corresponding grid pattern "seen" by the computer or represented by the coordinate outputs from the tablet are represented in FIG. 5 as exhibiting a distortion. Note that in the x-coordinate direction, a bowing effect is witnessed having a most severe effect at the middle of the plot shown at positions 68 and 69. Correspondingly, an even more severe "bowing" of the lines of the plot occur along the y-coordinate direction and, as before, the most severe region of distortion occurs at the mid-point of the upper and lower portions of the plot as represented at 70 and 71. It may be recalled, with the arrangement of FIG. 1A, the resistor chains 18a–18e and 22a–22e establish voltage gradients along the grid lines of the tablets depending upon the location of excitation input and ground. In effect, a step potential is created across the tablet depending upon the mode of data collection at hand. An investigation of the performance of the tablet has shown that, because of the large number of positions of overlap of x-coordinate grid elements and y-coordinate grid elements, there are developed a multitude of small capacitance values for each overlap or intersection. Thus, during the operation of the tablet, a certain portion of the current evolved in the x-direction grid element excitation is coupled into the y-coordinate resistor chain and this current flows in both directions toward the grounded terminals of that resistor chain. The converse also is true, capacitance being developed between each intersection evolving into currents of a leakage variety which travel in opposite directions along the x-coordinate resistor chain. As a consequence, a leakage error voltage is developed having a characteristic of most severity at the central portion of the edges of the plot. This leakage error voltage reacts somewhat as a set-off to evolve the error regions typified at the most severe portions of the plot of FIG. 5 at 68–71. In effect, the locator or cursor is reacting to a composite of two voltages to develop coordinate pair data. It is opined that the severity of the information developed along the y-coordinate, i.e. at 70 and 71 is enhanced, inasmuch as for the example shown, the y-coordinate grid elements are spaced further from the working surface and thus from the pick-up or cursor employed with the system. Accordingly, a weaker initial signal is effected by the leakage error voltages.

Looking to FIGS. 6A and 6B, a structuring or architecture of the grid elements which achieves a significant improvement over the distortional effect shown in FIG. 5 is revealed. In FIG. 6A, a cross-over location of an x-grid element 72 and a y-grid element 73 representing prior designs is revealed. These elements pass across one another within a region designated A1. Recall that the insulative support described at 56 resides intermediate these two grid elements and, may be provided, for example, as Mylar having at thickness of 0.015 inch. This Mylar or typical spacer-support will function as a dielectric in the capacitive interaction between the grid elements. In accordance with the instant invention, the architecture or geometry for the grid elements is altered as represented in the exaggerated form of FIG. 6B. In the figure, the vertical grid element 74 carrying x-coordinate information is shown having a width W1 in the central region of each defined grid. However, as the grid element approaches an intersection with a corresponding horizontal grid element, it is necked down as at 75, whereupon it then resumes its wider dimension as represented at 76. In similar fashion, a horizontally disposed electrode which carries y-coordinate information and are spaced further from the working surface of the tablet due to the insulative spacing is shown at 77 having a width dimension W2. As in the earlier case, this width, W2, becomes necked down to a narrow dimension as the vicinity of the cross-over region is approached as at 78. The grid element then resumes its mid grid width W2 as at 79. By so necking down the cross-over locations in the grid element pattern, the area evolving a capacitive coupling now is reduced to that shown at A2. Thus, much smaller opportunity for capacitive coupling exists. One other aspect may be provided with the architecture of FIG. 6B, that being that the grid element which is furthest from the working surface, i.e. as at 77 can be made having a greater width W2 than the electrode closest to the working surface. This has a tendency to improve the linearity of the system and accommodate for the more severe distortions obtained as described in conjunction with FIG. 5 at 70 and 71.

The result of the inproved grid element architecture or structuring described in conjunction with FIG. 6B is revealed in FIG. 7. Referring to that figure, a plot is provided which was developed under the same conditions as in conjunction with FIG. 5 but with the improved grid element geometry. Note that the vertical region bowing earlier described at 70 and 71 has diminished considerably as represented at 70a and 71a. Similarly, the horizontally directed bowing effect as earlier described in conjunction with regions 68 and 69 has importantly been diminished as represented, respectively, at 68a and 60a. Dimensions employed to achieve these improvements have provided that the width, W1, was 0.059 inch, the width, W2, which is furthest from the working surface was provided as having a dimension of 0.079 inch and each of the necked-down regions as at 75 and 78 were provided having a widthwise extent of 0.020 inch, a width representing the least which can be practically screen printed. The distortion shown in FIG. 7, represents about a 70% improvement over those represented in FIG. 5.

Still another corrective technique can be employed to achieve additional improvement in the linearity of translation from digitizer surface to ultimate coordinate pair signal data through a multiple terminal approach which further serves to dissipate the capacitive induced leakage voltages or currents.

Figure 1B:
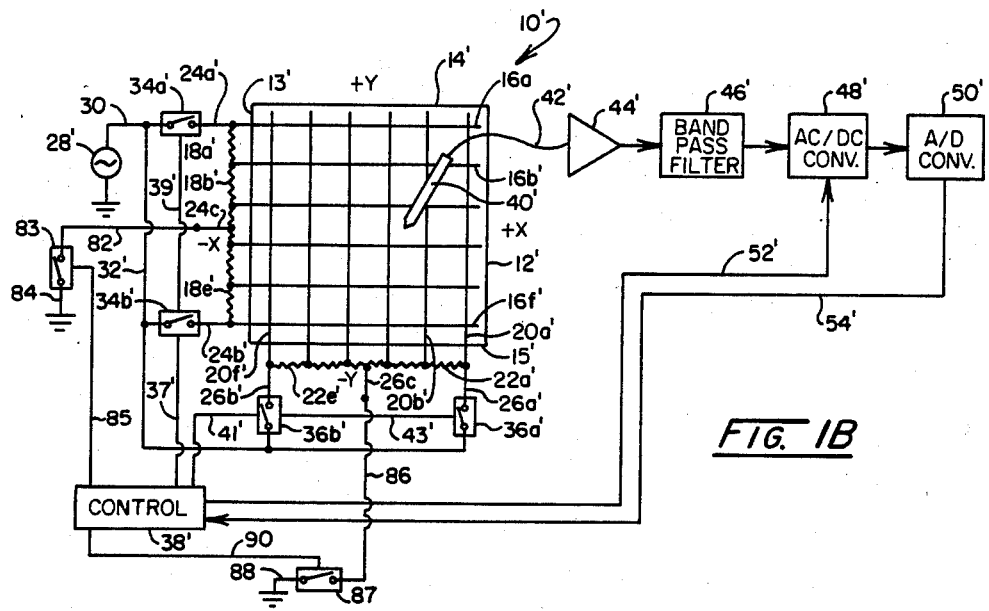

Referring to FIG. 1B, the digitizer structure described in conjunction with FIG. 1A again is reproduced with all components common with the latter figure being again shown in primed fashion. Added, however, to the structure in FIG. 1B are additional terminals. In this regard, the y-coordinate defining resistor chain 18′a-18′e now contains a third terminal 24c, while the x-defining resistor chain 22′a-22′e is shown having a third terminal 26c. These terminals are seen to be at about the mid-points of the resistor chains. Terminal 24c is shown coupled via line 82 to one input of a switch 83, the opposite input to which is directed to ground as represented at line 84. Additionally, the switch is seen to be controlled from the control function 38′ as represented at line 85. In similar fashion, terminal 26c is coupled via line 86 to one input terminal of switch 87, the opposite input of which is directed to ground as represented at line 88. The switch 87 is controlled from the control function 38′ as represented by line 90.

With the arrangement shown in FIG. 1B, while the two modes of operation still are carried out, with the instant technique, the control 38′ actuates switch 83 to couple terminal 24c to ground or 0 voltage, i.e. to effective ground, during the interval when the non-associated resistor chain 22′a-22′e is excited from the a.c. source. Because switches 34′a and 34′b also couple the end terminals to ground during this interval, the resultant lead path for leakage currents evolved by grid element cross-over capacitance is considerably reduced and the resultant potential build-up from these capacitively induced currents is diminished accordingly. In the opposite mode of performance, when the resistor chain 18′a-18′e is energized from an a.c. source, then switch 87 closes to couple mid terminal 26c to ground in conjunction with the coupling of n terminals 26a-26b to ground through respective switches 36a and 36b. Thus, during that operational mode the path for leakage induced currents again is halved and the resultant potential available from those currents is effectively halved.

Referring to FIG. 1C, an alternate approach to the multi-terminal refinement of FIG. 1B is revealed. As before, all components earlier described in conjunction with FIG. 1A remaining common with that figure are shown in FIG. 1C in double primed fashion. In the figure, terminal 24c of FIG. 1B again is represented at 24″c. The terminal is coupled via line 91 to one terminal of a switch 92. Switch 92 is of the earlier-described variety which imposes a ground level signal at line 91 when it is in an open condition. The opposite terminal of switch 92 extends through lines 93 and 94 to the mid-point of a divider network comprised of line 95 and resistors R1 and R2 coupled about a.c. source 28″. Switch 92 is shown controlled via line 96 from control 38″. In similar fashion, a mid resistor chain terminal 26c″ is located intermedia terminals 26a″ and 26b″ which is coupled via line 97 to a switch 98 identical to that at 92 and controlled from control 38″ via line 99.

Resistors R1 and R2 are selected such theat the potential available at center tap line 94 and presented to switches 92 and 98 is proportioned with the voltage gradient of an associated resistor chain. Thus, if terminal 24c″ is at the mid-point of resistor chain 18a″-18e″, then, a voltage level of one-half the value normally generated at the end terminal would be applied. The same arrangement is provided in conjunction with terminal 26c″. In operation, during an x-coordinate mode wherein resistor chain 22a″-22e″ is alternately excited, switch 98, as controlled from control 38″, will apply the attenuated a.c. signal via line 97 to terminal 26c″. Simultaneously, switch 92 will be open and terminal 24c″ will be coupled with ground in the same fashion as terminals 24a″ and 24b″. Thus, the grounding results accomplished with the arrangement shown in FIG. 1B are repeated. These grounding results are the principal corrective measure of the arrangement of FIG. 1C, however some enhancement is achieved by the additional proportionately attenuated drive from line 94.

Figure 9:
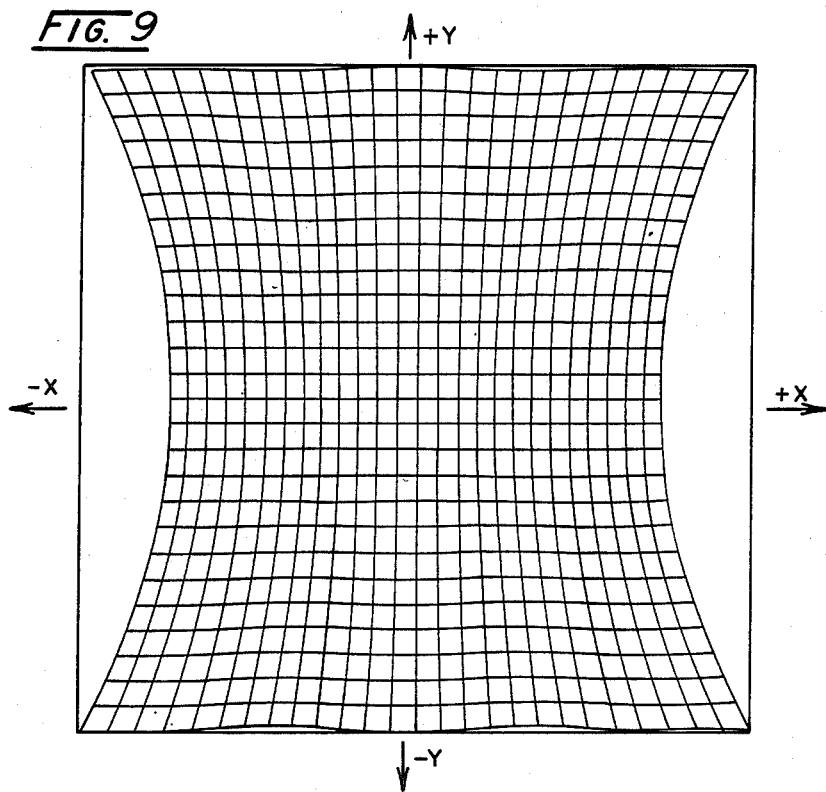
FIG. 9 is a grid plot developed as in FIG. 5 but showing internal terminal grid drive and grounding effects along one coordinate direction.
Figure 10:
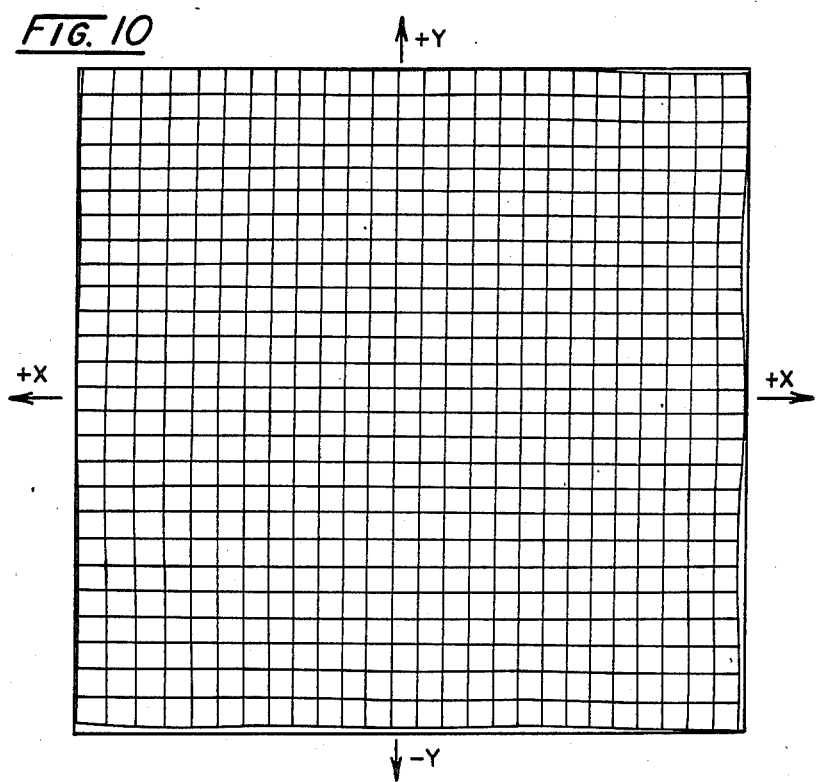
FIG. 10 is a grid plot developed as shown in conjunction with FIG. 5 but providing multiple interior drive and grounding along two coordinate directions.

Looking to FIG. 8, a plot is revealed developed with the same form of tablet as employed with FIG. 5 but with an additional terminal as described in conjunction with terminal 26c″ of FIG. 1C. FIG. 8 shows the results wherein improvement is achieved in conjunction with y-coordinate information, much slighter deviations being represented at regions 101, 103, 105, and 107. Referring to FIG. 9, the same test arrangement was created, however, employing two additional terminals along one resistor chain as opposed to the singular one shown in FIG. 8. The plot represented in the figure shows still improved performance over the plot represented at FIG. 8. In FIG. 10, the test arrangement of FIG. 1C was provided for both resistor chains and employing two equally spaced terminals for each resistor chain. The results again show a substantial improvement in performance which is readily corrected by the correction routine described later herein.

Figure 11A:
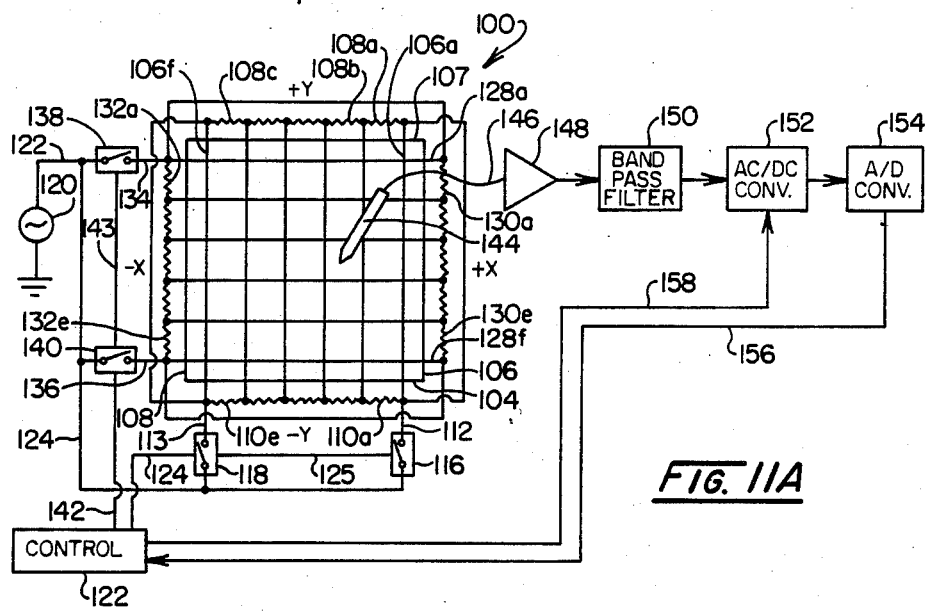

Now turning to the embodiment of the instant invention wherein the position responsive surface or tablet is transparent, reference initially is made to FIG. 11A wherein a stucture very similar to that described in connection with FIG. 1A is revealed with the exception that a different form of drive is involved and a different type of grid element is employed. In the latter regard, the elements laid down are transparent and, for example, may be an indium tin oxide material having a thickness in the order of about 150 angstrom units. This thickness is predicated upon such considerations as the form of substrate employed and the opportunities for any refractive distortion occasioned by the material. It is important that no such distortion occur in order for the digitizer tablets to be utilized with diagrammatic and pictorial material over which it is placed. For example, the tablets find utility for such applications as tracing developed X-ray photographs of spinal cord contours. Generally, a glass substrate is employed to support the indium tin oxide (ITO) grid elements in any of a variety of configurations. FIG. 11A shows the tablet 100 to be organized having x- and y-coordinate designated orientations of its grid arrays. For example, from border 102 to border 104 there is positioned an array of x-coordinate defining grid elements represented schematically at 106a–106f. These grid elements 106a–106f extend between two resistor chains incorporating discrete resistors 108a–108e adjacent border 102 and 110a–110e adjacent border 104. The resistor chains, as are designated generally at 108 and 110, discretely separate each of the grid elements 106a–106f and are seen to be selectively driven in parallel from common terminals 112 and 113. Terminals 112 and 113, in turn, are excited through respective switching functions 116 and 118 which are driven in common from an a.c. source through lines 122 and 124. As before, control to the switching functions 116 and 118 emanates from a microprocessor driven control function represented at block 122 and lines 124, 125. With the arrangement shown, excitation current and appropriate ground may be applied to both sides of the grid array 106a–106f simultaneously.

In similar manner, a y-coordinate array of grid elements 128a–128f is positioned upon an opposite face of the supporting substrate of the tablet structure 100. These grid elements 128a–128f extend between chains of resistors 130a–130e and 132a–132e. The resistor chains represented generally at 130 and 132, in turn are driven in parallel from common terminals 134 and 136 which lead, in turn, to respective switching functions 138 and 140. Switches 138 and 140 are driven from source 120 through lines 122 and 124 and are individually controlled from the microprocessor driven control 122 as represented by lines 142 and 143.

Similar to the embodiment of FIG. 1A, a stylus or suitable locator device 144 is employed for the purpose of picking up signals generated at the position responsive surface of the digitizer table 100. As before, the tablet is operated in two operational modes, one providing +x and −x information in the x-coordinate sense, and the other such mode providing coordinate information in the +y, −y coordinate sense. Stylus 144 is coupled by line 146 to a pre-amplification function represented at 148. The thus-amplified signal is filtered at band pass filter function 150, whereupon the signal is converted to a d.c. level as represented at block 152 and the resultant d.c. value is converted to a digital number as represented at block 154. A resulting digitized coordinate pair information is asserted to the control function 122 as represented by line 156, while the control therefrom over the a.c. to d.c. conversion function is represented by line 158.

Figure 12:
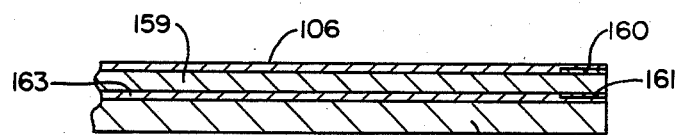
FIG. 12 is a partial sectional view of one structure implementing the position responsive surface of the apparatus of the invention.

When implemented in practical form, the tablet 100 may assume the structure shown and described in conjunction with FIGS. 3 and 6B, resistive strips as earlier described at 66 and 72 being employed for the discrete resistors of the resistor chains represented generally at 130, 132, 108 and 110, and ITO grid elements being employed in place of the silver deposition used in the arrangement of FIG. 1A. Because of the requisite transparency of the position responsive surface, the structuring of the tablet may employ a glass substrate which, in order to maintain a optimum spacing between grid arrays, may be quite thin. A structure accommodating such geometry is shown in FIG. 12 where a thin glass substrate is represented at 159 over which the grid arrays are coated. For example, the x-coordinate grid array 106 may be silk-screened upon the top surface of substrate 159 along with the oppositely-disposed resistor chains implemented as a resistive carbon strip, one of which is represented at 160. The opposite face of substrate or glass sheet 159 has a similar but orthogonally oriented y-coordinate grid array along with the resistive strip, one of the latter being represented at 161. To support the very thin structure, it may be adhesively attached to a supporting glass substrate as represented at 162 employing a polyvinyl butyral intermediate layer as represented at 163. The latter layer 163 is transparent and selected so as to avoid undue light refraction phenomena.

Figure 13:
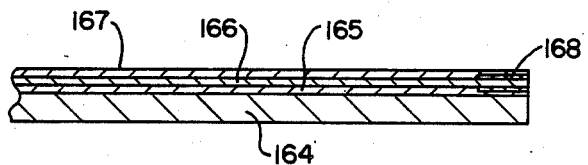
FIG. 13 is a sectional view of another design approach to the structure of electrographic apparatus according to the invention.

Another structural approached for digitizer structures as at 100 is shown in the representative sectional view of FIG. 13. With this arrangement, a relatively thicker glass support is provided as represented at 164. One of the coordinate grid arrays along with associated spaced resistive strips are laid down on the upwardly disposed surface of support 178 as represented at 165. This grid array and resistive structure then is overliad with an insulative transparent coating of silicon dioxide or the equivalent as represented at 166. The top surface of the insulative coating 166 then serves to support a next orthogonally disposed grid array 167 which will include spaced resistive strips or bands, one of which is represented at 168.

Figure 14:
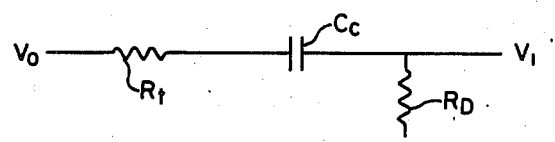
FIG. 14 is an equivalent circuit for examining error developed in conjunction with transparent position responsive grid layers for electrographic devices.

The employment of dual resistive chains and the simultaneous drive thereof from the excitation source 120 for transparent embodiments of the invention achieves important dimunition in error which otherwise is inherent in the system. To achieve transparency of the tablet structure 100, a material such as indium tin oxide is employed for the grid elements which exhibits a resistivity and thus, a finite resistance along its length. Because of this finite resistance and, further considering the frequency of excitation of the system, i.e. 60 KHz–140 KHz, an impedance condition for each grid line is occasioned which may be analyzed with an approach similar to that used in transmission line analysis. Considered in such analysis is the resistance or impedance of the ITO grid elements, the coupling capacitance associated with the pick-up or stylus 144 and the input resistance of the signal treating components of the system. Looking to FIG. 14, an equivalent circuit representing these aspects of the analysis of the grid elements and their excitation is provided. In the figure, $V_0$ represents the voltage at a given node on a resistor chain, while $R_T$ represents the resistance of the ITO element or track, $C_c$ represents the coupling capacitance at stylus 144, $R_D$ represents the input resistance of the signal treating or detection system, and $V_1$ represents the ultimately detected voltage value at the position of the stylus 144. Assigning conventional values to these parameters, an error in detected voltage may be computed.

Figure 15:
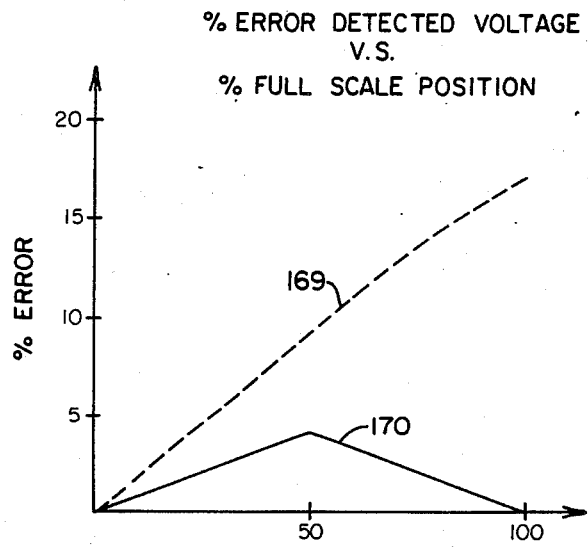
FIG. 15 is a plot of percent error versus grid surface position of an electrographic apparatus.

Referring to FIG. 15, the percent error occasioned by driving an ITO gid array under the geometry or structuring of FIG. 1A is represented by the dashed line 169. In the figure, the abscissa represents a percentage of the entire length of the grid element commencing with the position of node excitation. Where the grid element is excited from both ends thereof in the manner shown in FIG. 11A, then the error assumes the shape and dimensioning of curve 170. Note that a significant drop in the theoretical percentage of error realized is achieved. In particular, this error should be observed to be under 5% at its maximum peak for practical digitizer applications. The demonstration above shows an error of around 17% where the grid element is driven from one side only.

Figure 11B:
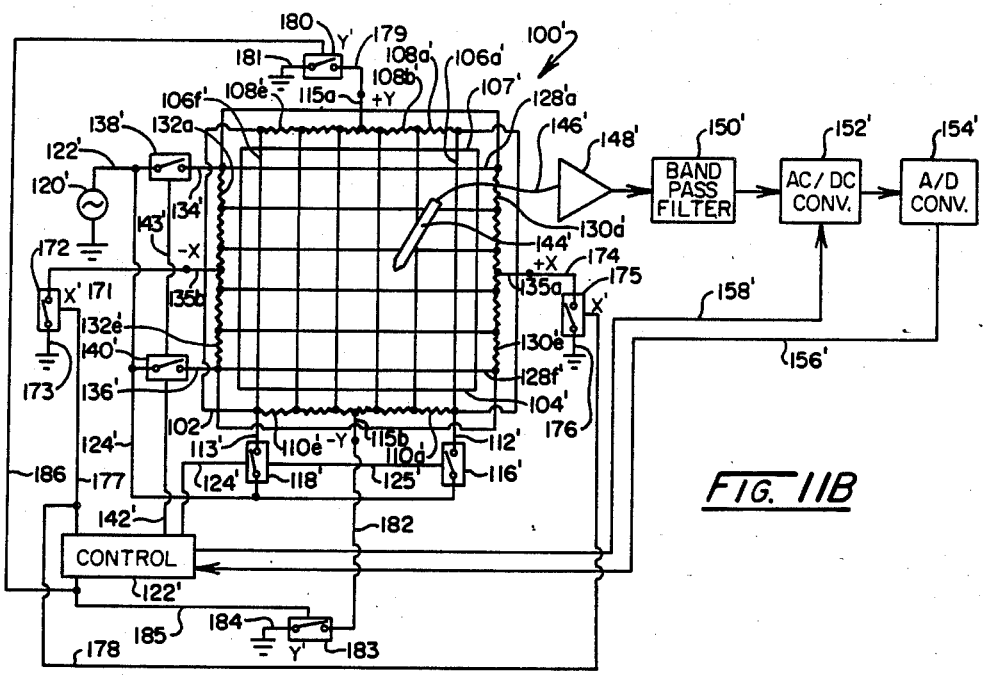

Referring to FIG. 11B, the dual drive digitizer arrangement shown and described in conjunction with FIG. 11A again is reproduced with prime numeration where components remain identical. However, in FIG. 11B, the additional grounding terminal arrangement corresponding with that represented in FIG. 1B is portrayed. In this regard, it may be observed that parallel resistor chains 130a'-130e' and 132a'-132e' each now has a respective mid-point terminal 135a and 135b. Terminal 135b is coupled via line 171 to one terminal of a switch 172, the opposite terminal of which is coupled through line 173 to ground. In similar fashion, terminal 135a is coupled through line 174 to one terminal of a similar switch 175, the opposite terminal of which is coupled to ground through line 176. Switches 172 and 175, preferably, exhibit a very low impedance. Control to switches 172 and 175 is provided simultaneously from control function 122' through connection therewith along lines 177 and 178.

In similar fashion, resistor chains 108a'-108e' and 110a'-110e' are provided respective mid-point terminals 115a and 115b. Terminal 115a is coupled via line 179 to one terminal of switch 180, the opposite terminal of which is coupled via line 181 to ground. Correspondingly, terminal 115b is coupled through line 182 to one terminal of a switch 183, the opposite terminal of which is coupled to ground. Control over switches 180 and 184 is provided from control function 122' by assertion of control signals through lines 185 and 186.

With the arrangement shown, as resistor chains 108a'-108e' and 110a'-110e' are excited in appropriate directions, terminals 135a and 135b are coupled to ground through their associated switches while switches 180 and 183 remain open. The converse arrangement obtains for a next mode of data acquisition wherein resistor chains 130a'-130e' and 132a'-132e' are excited. During this interval, switches 172 and 175 are opened, while switches 180 and 183 are closed to assert mid-point ground.

Turning next to FIG. 11C, the operation of the dual drive system in the manner described in conjunction with FIG. 1C is portrayed. In this figure, those components remaining in common with the corresponding components shown in FIG. 11A are retained with double prime notation. Looking to the figure, it may be observed that, again, mid-point electrodes 135a" and 135b" are coupled within respective resistor chains 130a"-130e" and 132a"-132e". Terminal 135a" is coupled via line 187 to one terminal of a switch 188, while the opposite terminal thereof is coupled through lines 189, 190, and 191 to a divider network comprised of resistors R3 and R4 within line 192 which are coupled across a.c. source 120".

In similar fashion, terminal 135b" is connected through line 193 to switch 194 to the A terminal of switch 194, the opposite terminal of which is connected through line 195 to line 190 and, thus, to the source 120" through the noted divider network. Control over switches 188 and 194 is derived from control function 122" through connection thereto from lines 196 and 197.

In similar fashion, mid-point terminals 115a" and 115b" are connected to respective resistor chains 108a'-'-108e" and 110a"-110e". Terminal 115a" is connected through line 198 to one terminal of a switch 199, while the opposite terminal thereof is connected through line 190 to line 191 and the divider network incorporated within line 192. In similar fashion, terminal 115b" is connected through line 200 to one terminal of a switch 201, while the opposite terminal thereof is, as before, connected to line 190. Control over switches 199 and 201 is derived from control function 122" through lines 202 and 203.

Accordingly, when parallel resistor chains 108a'-'-108e" and 110a"-110e" are excited in appropriate directions, switches 199 and 201 are closed to effect an attenuated proportional energization of terminals 115a" and 115b". During this mode of performance, switches 188 and 194 are open to impose a ground through respective terminals 135a" and 135b" to effect a bleed-off of capacitively induced leakage currents. In the next operational mode, switches 199 and 201 are open to impose ground through respective terminals 115a" and 115b", while the proportionate attenuated voltage input signal is simultaneously applied from switches 188 and 194 to terminals 135a" and 135b".

DRIVE CIRCUIT-FIG. 16A

Figure 19A:
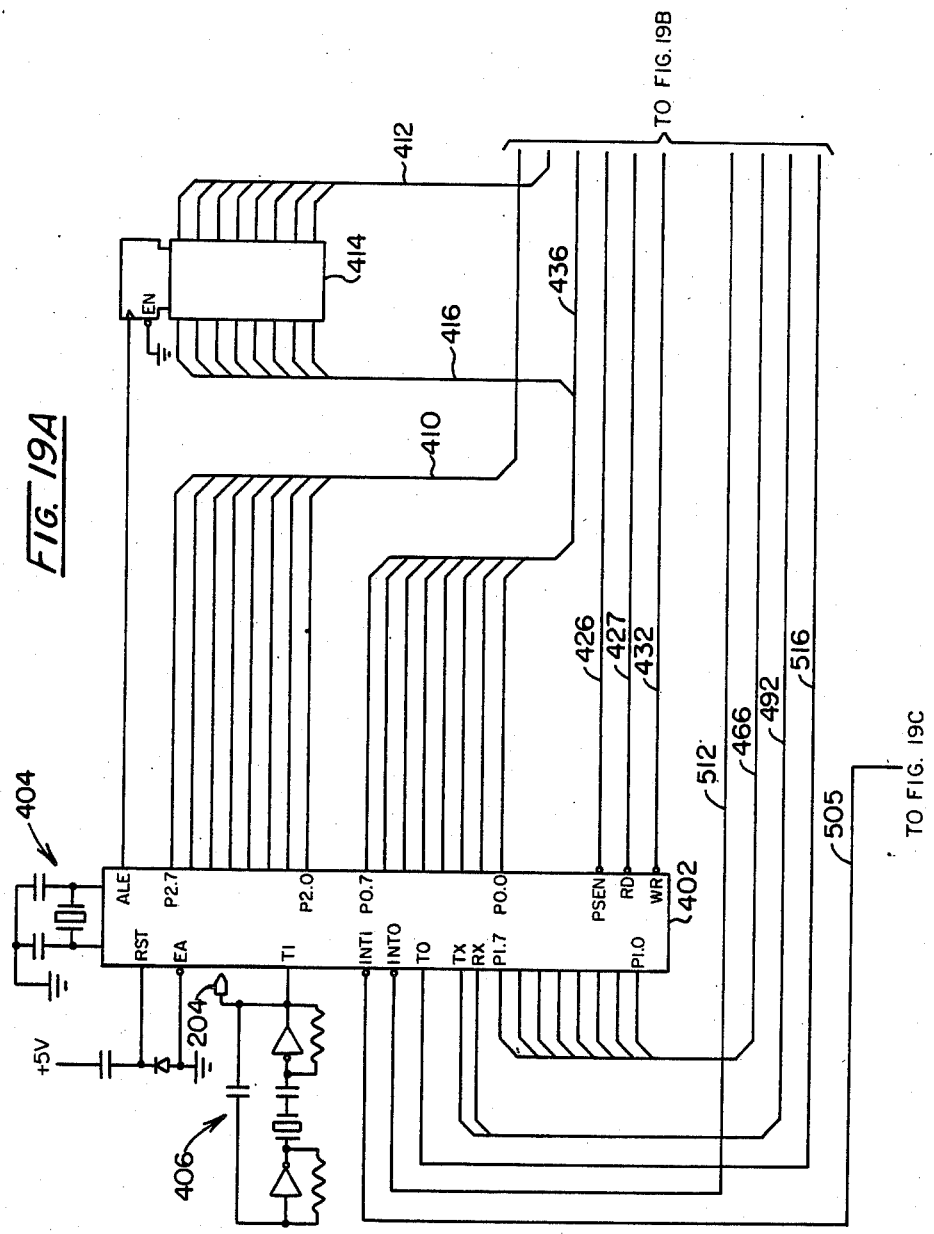

The drive to the resistor chains, as represented schematically in FIGS. 1A and 11A respectively at 28 and 120, emanates from a clock output associated with the microprocessor drive of controls 138 or 122 as illustrated in FIG. 19A at connector 204. That clock output is represented in the drive circuit of FIG. 16A at connector 104 which, for example, provides a 6.144 MHz square waveform input at line 205 which is directed to the B input of a divide-by-ten counter represented at 206. Provided, for example, as a type 74HC390 divider, the QD output of divider 206 is coupled via line 207 to its A terminal input to provide a 122.88 KHz square wave output at line 208. Line 208, in turn, is directed to the A terminal input of an identical type 74HC390 counter 210 which is tapped by line 212 at its QC output to provide a division by 5 of the input thereto from line 208. The resultant signal at line 212 is a square wave having a frequency of about 122.8 KHz. Line 212 is directed to the positive input terminal of a blocking unity gain amplification stage or buffer 214. Provided, for example, as a type LF353 operational amplifier, the stage 214 is configured with a feedback line 216 extending from its output to its negative input and is shown coupled between +15C and −15C power supply. Stage 214 provides a buffer between the logic signals of the control function and the analog section of the system and has an output at line 218 which is directed to an LC tank circuit represented generally at 220. Circuit 220 includes a capacitor 222 and inductor 224 and is structured to resonate at the noted 122 KHz frequency to convert the square waveform to sinewave form in keeping with communications regulation requirements.

It may be recalled that the x-coordinate and y-coordinate grid array elements are driven by an a.c. excitation source during alternate modes of operation. During these modes of operation, that grid array which is not excited by the a.c. source is held to ground such that a form of ground plane may be established by it. To improve the development of this ground plane at the unexcited grid array, it further is desirable to avoid the positioning of a series coupled switching element between the drivers of the grid array and the arrays themselves. Such switching technique, while providing the positive grounding desired, will develop a form of voltage divider and thus reduce the dynamic range of the output. These conventional switching approaches further present an element of drift error such as might be occasioned with changes of switching resistance and temperature and operational effects. Such changes would be reflected in the gain equation of any driver-amplifier and introduce unwanted complexity when corrective procedures are employed. To avoid these difficulties, a very practical and efficient switching technique has been developed. In this regard, it may be noted that the sinusoidal voltage signal from tank circuit 220 is introduced to the positive terminal of a voltage-to-current converter stage represented generally at 226. Configured in conventional fashion, the stage 226 includes an operational amplifier 228 which may be provided as a type LF353 and an associated network of resistors 231-234 including resistors 230 through which the sinusoidal voltage input is applied. Resistors 230 and 231 serve principally to set the gain of the amplifier, while the output thereof is adjusted as the proportion of resistor 231 to resistor 232. Gain further is adjusted by the subtractive effect of voltage divider resistors 233 and 234. The net effect is to provide unity gain and an output current proportional to the input signal. The resultant current output of stage 226 is provided at line 236 whereupon it is directed through lines 238-240 to four discrete solid-state switches S1-S4 for the embodiment of FIG. 11A. Switches S1-S4 may be provided as type DG211 and are actuated by control signals from the control function as represented by respective input connectors 242-245. Note that these connectors are respectively labeled XP, XM, YP, and YM representing an x(X) or y(Y) coordinate in a plus (P) or minus (M) direction. The output of each of the switches S1-S4 is directed along respective lines 248-251 to the negative terminal inputs of respective voltage follower stages 254-257. Stages 254-257 may be provided as type LF353 operational amplifiers shown, respectively, at 248-261, each of which is configured having a feedback path incorporating matched feedback resistors shown, respectively, at 262-265. Such matched resistors are readily available in conjunction with single substrate devices.

With the arrangement shown, when any given switch S1-S4 is closed, a resulting voltage will be imposed at the outputs of amplifiers 254-257 and will be presented at output lines 266-269 for use in driving an associated grid array. On the other hand, when any given switch of the grouping S1-S4 is opened, the input to a respective stage 254-257 will become zero volts and the output thereof at the appropriate one of corresponding output lines 266-269 will be at ground. The latter output lines are shown coupled to the grid array terminals described in conjunction with FIG. 11A. In this regard, note that lines 266 and 267, respectively, are coupled with terminals 112 and 113 associated with resistor chains 108 and 110 shown in the drawing as elongate resistors. Similarly, output lines 268 and 269 are coupled with respective terminals 134 and 136 leading, in turn, in resistor chains 130 and 132. As is apparent, the same drive techniques may be employed with the arrangement of FIG. 1A, resistor chains being removed. Matched resistors as at 262-265 are readily available, the criteria for their selection being that the resistors of the grouping be matched with each other as opposed to being matched with a specific target value of resistance. This assures that the voltage increments for each node provided by the grid array elements with a respect resistor strip are developed in regular voltage increments.

To assure that no signal coupling occurs between the input and output stages of the system through the power supply, decoupling circuits may be employed, one of which is shown in FIG. 17. Isolation is provided by the R-C structures of the networks which serve to provide low-pass filtering. The networks also resist noise otherwise encroaching from the digital components of the system. The circuits tap the plus and minus ($\pm 15$ v) outputs of the power supply and provide a $\pm 15$ v supply for the logic components shown. These power supply outputs are represented by the alpha-numeric designations A, B, C.

DRIVE CIRCUIT-FIG. 16B

Figure 16B:
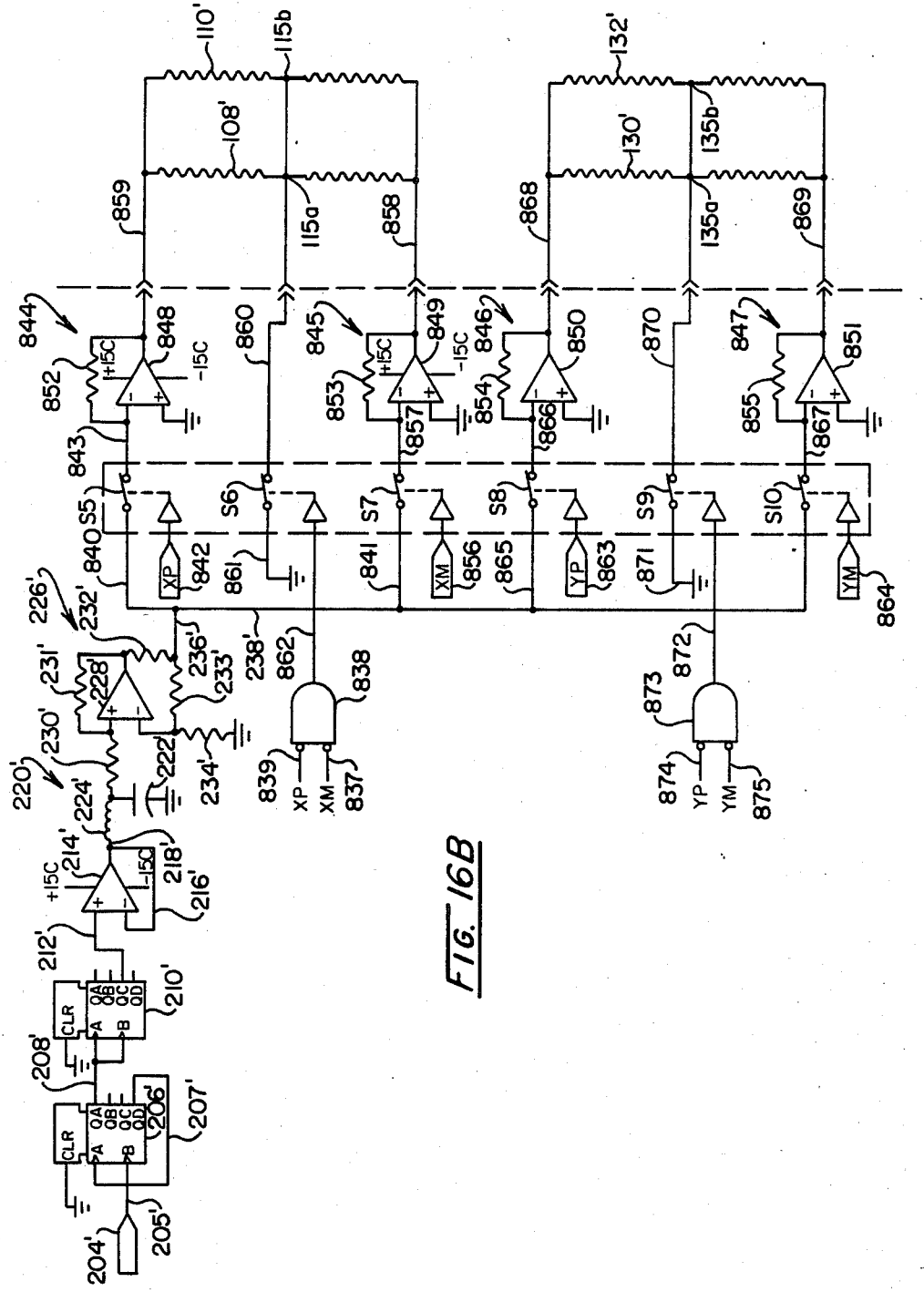

Referring to FIG. 16B, an adaptation of the drive circuit of FIG. 16A is illustrated which provides for the drive inputs associated with the embodiment of FIG. 11B. As will be apparent, this circuit also may be employed with the embodiment of FIG. 1B.

Inasmuch as the initial signal treatment for the drive circuit of FIG. 16B is identical to that described above in connection with FIG. 16A, those components common between the figures are again reproduced in FIG. 16B with the same numerical identification, however in primed format. Thus, it may be observed that line 236' provides a 122.88 KHz signal which is distributed along line 238'. Distribution line 238' serves to provide a.c. drive for the terminal drive inputs of resistor chains 108' and 110' as shown in FIG. 11B through lines represented at 840 and 841. Line 840 is seen directed to one input of a solid-state switch S5 which is controlled from the microprocessor driven control function through a connector labelled "XP" and represented at 842. The opposite terminal to switch S5 extends via line 843 to the negtive terminal inputs of a voltage follower stage 844 which is seem to be one of four such stages, 844-847. As before, these voltage follower stages 844-847 may be provided as type LF353 operational amplifiers shown, respectively, at 848-851, each of which is configured having a feedback path incorporating matched feedback resistors shown, respectively, at 852-855.

The opposite x-defining input is provided from the control through connector 856 labelled "XM". This input controls solid-state switch S7 coupled within line 841. The opposite terminal of switch S7 extends through line 857 to the input of voltage follower stage 845, the outputs of which at line 858 extend to one side of each of earlier-described resistor chains 108' and 110' while the output of corresponding stage 844 extends to the opposite drive terminals of those resistor chains via line 859. The center position terminals 115a and 115b of respective resistor chains 108' and 110' are reproduced in the instant figure and are shown coupled to line 860 which extends to one terminal of solid-state switch S6. The opposite terminal of switch S6 is coupled via line 861 to ground, while the switch is shown controlled from line 862 and negative true input OR gate 838. The inputs to gate 838 are shown at lines 839 and 837, respectively labelled, carrying the signals XP and XM. Thus, in the absence of both these signals, switch S6 is closed to hold the mid-point terminals to a ground or 0 voltage condition.

In similar fashion, excitation control over the y-defining resistor chains 130' and 132' provided by microprocessor inputs to connectors 863 and 864 respectively labelled "YP" and "YM". Connector 863 provides control over a solid-state switch S8 which is coupled with line 238' from line 865, the opposite terminal thereof being directed via line 866 to the negative input terminal voltage follower stage 846. In similar fashion, connector 864 controls a solid-state switch S10, one terminal of which is associated with line 238' and the opposite terminal of which is directed through line 867 to the negative input of voltage follower stage 847. The outputs of stages 846 and 847 are shown, respectively, at lines 868 and 869 being directed to the oppositely disposed excitation terminals of resistor chains 130' and 132'. As before, the mid-point terminals 135a and 135b again are reproduced in the instant drawing and are shown coupled by line 870 to one terminal of a solid-state switch S9, the opposite terminal of which is coupled via line 871 to ground. Switch S9 is controlled from the output line 872 of a negative true logic gate 873 having input lines at 874 and 875. These lines carry respective control input signals YP and YM and provide for the closure of switch S9 only in the absence of both.

DRIVE CIRCUIT-FIG. 16C

Figure 16C:
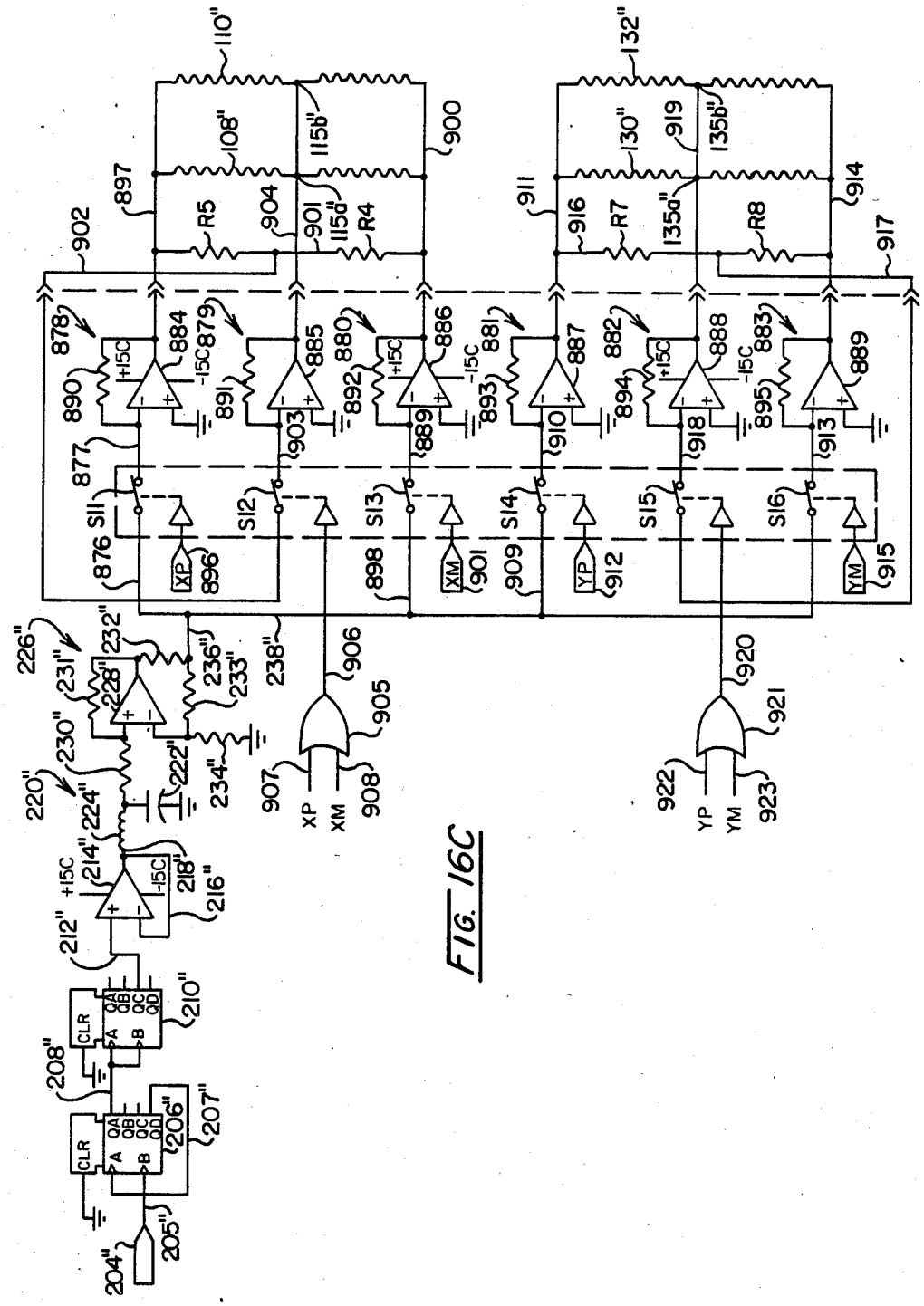

The drive circuit arrangement for use with the embodiment illustrated in FIG. 11C is represented at FIG. 16C. As before, this circuit can be employed with the embodiment of FIG. 1C. The initial signal treatment components again are identical to those described in conjunction with FIG. 16A and thus are numbered in the same fashion with double priming. Accordingly, the initial a.c. signal development circuit provides an a.c. excitation signal at line 238" at a frequency of 122.8 KHz which is directed along line 876 to one terminal of a solid-state switch S11. The opposite terminal of switch S11 is directed through line 877 to the negative input of a voltage follower stage 878. Stage 878 may be observed to be one of a sequence of six such stages, 878-883. As before, these stages may be provided as type LF353 operational amplifiers shown, respectively, at 884-889, each of which is configured having a feedback path incorporating matched feedback resistors shown, respectively, at 890-895.

Switch S11 is controlled from the microprocessor based ciontrol through connector 896 carrying an XP signal. Thus, upon the closure of switch S11 a full value a.c. drive output is provided at output line 897 to one end terminal of resistor chains 108" and 110". The opposite end of these resistor chains is selectively excited from line 898 which extends from distribution line 238" to one terminal of switch S13. The opposite terminal of switch S13 is coupled by line 899 to follower stage 880 to provide an output at line 900 for exciting resitor chains 108" and 110". This output is controlled from the control system via connector 901 carrying an x-minus or "XM" signal.

To provide mid-point proportioned parallel drive as well as the important grounding, for the instant embodiment, resistors R5 and R6 within a line 901 are shown coupled across excitation lines 897 and 900. The midpoint between these resistors is tapped at line 902 which extends to one terminal of a solid-state switch S12. The opposite terminal of switch S12 is coupled by line 903 to the negative input of follower stage 879 to provide the requiste proportioned output developed from the division by resistors R5 and R6 at line 904. Line 904 is coupled to the earlier-described mid-point terminals 115a" and 115b" to provide intermediate excitation. It may be observed that switch S12 is controlled from the microprocessor driven control arrangement by an OR function 905 having an output at line 906. Thus, switch S12 will be closed upon the presence of a logic true input at either of lines 907 or lines 908 which carry, respectively, the signals XP and XM. The switch will be open during y-coordinate evaluations to impose the requisite ground during those modes of performance of the system.

Looking to the y-coordinate development, it may be noted that one terminal of the solid-state switch S14 is coupled to distribution line 238" from line 909, while the opposite terminal thereof at line 910 is directed to the negative input of voltage follower stage 881 to provide an output at line 911 which is directed to the end terminals for full excitation of resistor chains 130" and 132". Switch S14 is controlled from the control system via connector 912 which is shown to carry the signal "YP". The opposite end of the instant resistor chains are driven from line 238" which is connected to one terminal of solid-state switch S16. The opposite terminal of that switch is connected via line 913 to the negative input terminal of follower stage 883 to provide a full excitation output at line 914 which is directed to the opposite end terminal of resistor chains 130" and 132". Switch S16 is controlled by the control system by a command signal "YM" applied at connector 915.

The mid-point excitation and ground arrangement for the instant resistor chains is provided from a divider network comprised of resistors R7 and R8 connected within line 916 between excitation lines 911 and 914. The mid-point of resistors R7 and R8 is tapped by line 917 which is coupled to one end of solid-state switch S15, the opposite terminal of which at line 918 is directed to the negative input of voltage follower stage 882. The output of stage 882 is provided at line 919 which is coupled to the earlier-described mid-point terminals 135a" and 135b" of respective resistor chains 130" and 132". Switch S15 is controlled from line 920 which extends from OR function gate 921 which, in turn, is coupled to react and control from input lines 922 and 923 carrying respective signals YP and YM. Thus, as before, switch S15 is closed during the excitation of resistor chains 130" and 132" and is opened to provide a ground at line 919 when those chains are not excited.

SIGNAL TREATING CIRCUIT

Figure 18:
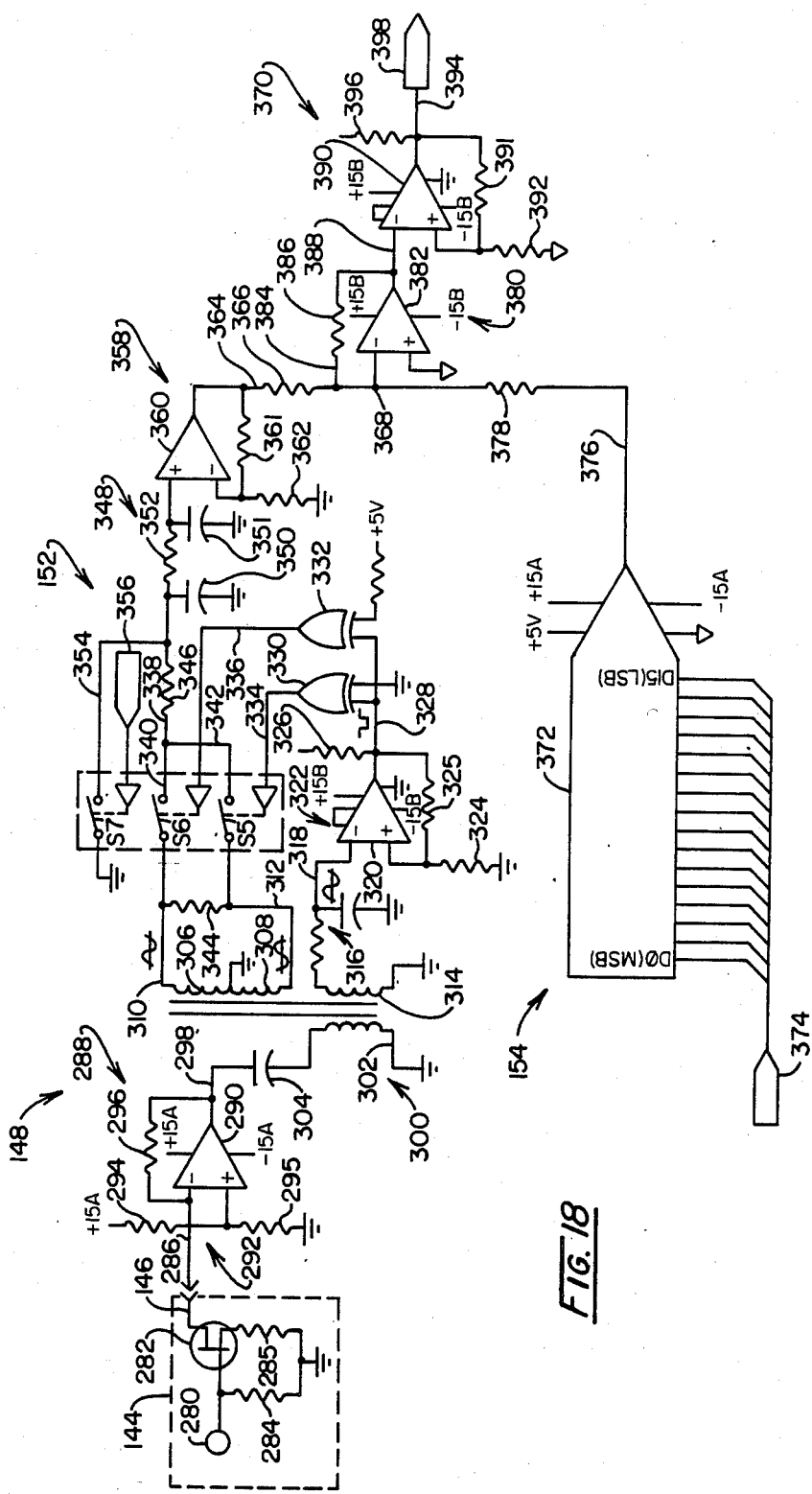
FIG. 18 is a schematic diagram of a circuit for carrying out pick-up and signal treatment as may be employed with the instant invention.

Referring to FIG. 18, the stylus or pick-up described, for example at 144 in FIG. 5 again is reproduced, however, within a dashed boundary designated by the same numeration. The stylus 144 or, for example, a cursor or the like will include a pick-up element shown herein as an annulus 280. The output of this annulus is directed to the gate input of a source follower provided as a field effect transistor (FET) 282. FET 282 is configured in conjunction with resistors 284 and 285 to convert the voltage output of the pick-up 280 to a current so as to provide a signal output which is essentially free of environmental influence at cable 146. Cable 146, as described in conjunction with FIG. 11A, is coupled to an input circuit which provides a preliminary amplification, as has been earlier described in general at 148 in FIG. 5 and at 44 in FIG. 1. Current from the stylus or locator is applied through line 286 to a current-to-voltage conversion stage represented at 288. Stage 288 additionally provides an amplification function and is structured including an operational amplifier 290, the negative input to which is coupled with line 286 and the positive input terminal of which is coupled to a biasing network 292 comprised of resistors 294 and 295 coupled between +15A and ground and serving to assert about a 10 v bias to maintain FET 282 in an "on" condition. A feedback path including resistor 296 extends about operational amplifier 290 to provide a conversion coefficient, for example, of about 1,000 and the output thereof at line 298 is present as an a.c. voltage with a d.c. component combined therewith.

The a.c. signal at line 298 then is directed to the input of an a.c. to d.c. conversion network represented at 152. Network 152 employs a tuned transformer. Transformer 300 is configured having a primary winding 302 through which the a.c. signal is coupled via capacitor 304. The secondary side of transformer 300 includes identical windings 306 and 308 extending from a grounded center tap and developing complementary sinusoidal signals at lines 310 and 312. Complementary positive going half-cycles of these signals are united by the system to evolve a d.c. level. Transformer performance further provides a filtering function. In order to carry out the necessary phase synchronized switching to develop this half-cycle orienting procedure, a third secondary winding 314 is provided with transformer 300, the output of which extends through a phase lagging R-C adjusting network and line 318 to the negative input terminal of the operational amplifier component 320 of a comparator-squarewave stage 322. Amplifier 320 may be provided, for example, as a type LM311 which is configured in conjunction with resistors 324–326 to provide a square wave output which is phase synchronized with the outputs at lines 310 and 312. The resultant output at line 328 is simultaneously applied to the inputs of two Exclusive OR gates 330 and 332 which serve as inverters and provide actuating signals along their respective output lines 334 and 336 to switches S14 and S18. Switch S18 is actuated to convey the sinusoidal signal at line 310 to a passive summing node 338 in line 340. Similarly, switch S14 passes the complementary sinusoidal signal from line 312 to the node 338 through line 342. A blocking resistor 344 is shown coupled between lines 312 and 310. The resultant signal at node 238 is a continuous sequence of positive going half-cycles having ripple characteristic but representing a filtering out of the d.c. offset otherwise developed at line 298 from stage 288. The resultant d.c. signal, evidencing a very slight ripple, is directed along line 340 through resistor 346 to a two-pole filter represented generally at 348 and including capacitors 350 and 351, as well as a resistor 352.

Periodically during the operation of the system, the input to the filter 348 at line 340 is coupled to ground via line 354 and switch S19. Switch S19 is actuated by the microprocessor driven control as represented by connection 356. By being so coupled to ground, any d.c. offset may be measured by bringing line 340 to ground or a zero input condition. The measured offset then is subtracted or added to develop digital values depending upon the required polarity involved.

From the filter stage 348, the d.c. level signal is amplified at amplification stage 358 which is provided as a type LF353 operational amplifier 360, the gain of which is adjusted by resistors 361 and 362 and the output of which is provided at line 364. Line 364 is shown extending through a resistor 366 to a summing node 368 which is provided as the entrance point to a comparator stage represented generally at 370. Stage 370 is used for the purpose of supporting a progressive sampling form of analog-to-digital conversion of the signal applied from line 364. In order to achieve larger word size conversion at practical cost, a complementary arrangement is developed wherein a 16-bit input digital-to-analog converter 372 is employed. Converter 372 is successively driven by a sequence of digital, 16-bit inputs from the microprocessor driven control function via connector 374. Provided, for example, as a type DAC1600KP-V, the output of the converter (DAC) 372 is provided at line 376 which is directed through a resistor 378 of equal magnitude to resistor 366 to be summed with the signal from line 364 at summing node 368. The signals from lines 364 and 378 then are introduced to the negative input terminal of a pre-comparator stage formed of operational amplifier 382 and feedback line 384 incorporating resistor 386. Providing a high gain amplification of the difference of the signals at lines 364 and 376, the output of stage 380 is introduced along line 388 to the negative input terminal of an operational amplifier 390 which may, for example, be provided as a type LM 311. The positive input to the amplifier 390 is coupled with resistors 391 and 392 which serve to provide a slight hysteresis performance and the output thereof is provided at line 394. Because of the open collector structuring of the device, a pull-up resistor 396 is provided in connection with line 394. The output of the comparator stage 370 is monitored by the microprocessor function of the control arrangement of the apparatus as represented by the connector symbol 398. As is revealed in more detail in conjunction with FIG. 21A–21C, the microprocessor control provides numeric input to converter 372, which inputs are compared with the signal at line 364 through successive approximations. After a predetermined number of cycles (here, sixteen), the value of the input to the converter 372 is taken as the digital value of the coordinate reading.

In general operation, the input to converter 372 seeks to search for a condition wherein the value of the initially presented voltage is greater or less than one-half scale. If it is assumed that the input is greater than half-scale, then that assumption is tested and, if false, the next bit is examined. In effect, a 16-bit analog-to-digital conversion can be carried out with only 16 attempts.

CONTROL CIRCUIT

As represented at blocks 38 and 122 (primed or otherwise) in FIGS. 1A–1C and 11A–11C, respectively, the control for the instant devices is microprocessor driven, employing, for example, a type 8051 microprocessor marketed by Intel, Inc., San Clara, Calif. The control circuit is illustrated in connection with FIGS. 19A–19D which should be mutually arranged in accordance with the labeled joining brackets on each thereof. Looking to FIG. 19A, the microprocessor component is shown at 402 operating in conjunction with a 12 MHz crystal driven clock 404. Because the internal counter structure of this particular microprocessor his limitations in developing a 9600 baud rate performance, a secondary crystal driven clock 406 is provided having an input at the T1 terminal thereof. Clock 406 provides a 6.144 MHz square wave pulse output which additionally is employed as the input to the drive electronics described in conjunction with FIG. 11 at connector 200. The latter connector is reproduced in FIG. 19A. Program control input to the microprocessor 402 is provided at an A8–A15 input thereto from a read only memory ROM 408 (FIG. 19B) via multi-lead bus 410. Additionally, the A0–A7 terminal outputs of ROM 408 are available through multiplexed bus 412 which extends to a type HC373 latch 414 (FIG. 19A). Latch 414 is coupled in turn, via bus 416 to the P0.0-P0.7 terminals of microprocessor 402. The latter ports also provide address output controls. Note that the latch 414 output along bus 412 also extends via bus 418 to random access memory (RAM) 420 (FIG. 19B) which may be provided as a type 4802. Coupling also is provided at address locations A8-A10 to the RAM 420 via buses 410 and 422 and a chip select (CS) function is provided from bus 410, the signal developed from leads A14 and A15 being enhanced by gates 424 and 425. A read command to the RAM 420 is provided at the RD terminal thereof via leads 426 and 427 extending, respectively, from the PSEN and RD terminals of microprocessor 402 thereto through signal enhancing gates 428 and 429. A write command from microprocessor 402 to the RAM 240 is generated from the WR terminal of the former and directed along lead 432 to the corresponding terminal in RAM 420. The output ports of RAM 420, designated $O_0-O_7$ are coupled along with the corresponding output ports of read only memory 408 with multi-lead bus 434 which extends via bus 436 to RAM 420 the P0.0-P0.7 ports of microprocessor 402 via bus 436. ROM 408 is enabled through its chip select (CS) input terminal from ports P2.6 and P2.7 and and bus 410 through a signal enhancing gate grouping 438-440. Additionally, the output enable (OE) terminal of the ROM 408 is actuated from the PSEN terminal of microprocessor 402 via lead 426.

The 16-bit sampling input word to the digital-to-analog converter 372 described in conjunction with FIG. 2, which is utilized for the complementary purpose of analog-to-digital conversion, is derived by a sequence of outputs from ports P0.0-P0.7 of microprocessor 402 as asserted along multi-lead bus 436 to parallel latches 444 and 445 as shown in FIG. 19B. Provided, for example, as type HC374, the outputs of these latches at respective lead arrays 446 and 447 develop the signals DAC0-DAC15 which are asserted as represented by connector 374 in FIG. 12 to the DAC372. Enablement of latches 444 and 445 emanates from a decoder 450 (FIG. 19D) which performs a one-to-eight line decoding function along with a similar decoder component 451. Address inputs to the decoder 450 are provided from microprocessor 402 via bus 410 emanating from terminals P2.0-P2.7 as represented at bus extensions 452 and 453. The E terminal of decoder 450 also is selectively actuated from the write (WR) terminal of microprocessor 402 via lines 432 and 454. In similar fashion, five leads from bus 452 extend to decoder 451, while the E terminal thereof is selectively actuated from the read (WRD) terminal of microprocessor 402 via leads 427 and 456. Latch 444 is selectively enabled from decoder 450 via line 458 which incorporates an inverter 460. Similarly, latch 445 is enabled from decoder 450 via line 462 and inverter 464.

As described in conjunction with FIG. 11, the control aspects of the instant apparatus provide for the dual mode and sequential actuation of switches S1-S4 by the application of x- and y-coordinate, ground and excitation signals. The microprocessor 402 carries out this function from its output terminals P1.0-P1.7 through bus 466 which extends, inter alia, to leads 467-470 and respective connectors 243, 242, 244, and 245 (FIG. 19D). The latter connectors carry the signals designated, respectively, XM, XP, YP, and YM. These signals XP, XM, YP and YM also are employed to control the alternate drive circuit embodiments being directed to respective connector grouping: 842, 856, 863 and 864 as well as line grouping 839, 837, 874 and 875 in FIG. 16B. Additionally, the signals are applied to respective connectos 896, 901, 912 and 915 as well as line grouping 907, 908, 922 and 921 in FIG. 16C. Microprocessor 402 also provides a ready-to-send and data terminal ready signal from bus 466 via respective leads 471 and 472 which extend through respective buffers 473 and 474 to provide outputs at respective leads 475 and 476. A lead 477 extending from bus 466 through buffer-inverter 478 serves to forwardly bias the base emitter junction of NPN transistor 480 through base resistor 481. When so turned on, transistor 480 couples one side of a light emitting diode (LED) 482 to ground, the opposite input thereto being coupled through resistor 483 to +5 v. LED 482 may be employed to indicate that the apparatus is in proper order for running, internal diagnostics and the like having been appropriately carried out by microprocessor 402. Bus 466 also serves to receive a clear-to-send signal from a host computer via lead 484 and from the output of a buffer 486. Finally, leads 467-470 may be combined logically by microprocessor 402 in conjunction with AND gate 488 to provide an offset signal at lead 490 which is applied to switch S7 via connector 356 as described in conjunction with FIG. 20.

Serial interactive communication with a host computer is carried out from the TX and RX terminals of microprocessor 402 via two lead bus 492 which extends via lead 493 and buffer 494 to provide a transmission output and which extends through lead 495 and buffer 496 to receive transmissions. In this regard microprocessor 402 includes a UART function internally.

Operational status signals may be received from locator or stylus 144 from switches thereon, the outputs of which are represented at pull-up network 498 (FIG. 19C). Network 498, for example, may receive inputs instructing the microprocessor to read a particular position for the stylus, as well as any of a number of optional commands. These commands are grouped at bus 500 which extends at bus 502 to a four input NAND gate 504 to assert an interrupt signal via lead 505 to the interrupt (INT1) terminal of microprocessor 402. Bus 500 also extends to provide for discrete inputs to a tri-state buffer 506. Provided, for example, as a type 74HC244 tri-state device, the buffer 506 is enabled by a low true read enable signal from leads 508 extending from three-lead bus 510. Bus 510, in turn, extends from the decoder 451 which, in turn, is controlled from microprocessor 402 via buses 410 and 542. The buffered output emanating from the stylus or tracer switches is presented along bus 434 to random access memory 420 for access by microprocessor 402.

Another interrupt terminal of microprocessor 402 (INT0) may provide an output along line 512 to read the compare value at lead 394 of comparison network 370 as described in conjunction with FIG. 12 with respect to the analog-to-digital conversion function. Additionally, the T0 terminal of the microprocessor may be employed to energize another light emitting diode 514 (FIG. 19B) via lead 516, buffer 518 and NPN drive transistor 520. The emitter of transistor 520 is coupled to ground, while the base emitter junction thereof may be forwardly biased through bias resistor 521 to permit the energization thereof from +5 v through resistor 522. LED 514 may, for example, be positioned within the stylus as at 144 to indicate to the operator that a valid coordinate pair has been read and is being accepted by the host computer. A third light emitting diode 524 may be provided on the apparatus to indicate that a menu selection soft key arrangement programmed for a portion of the tablet surface is active. The LED 524 is energized by forward biasing the base emitter junction of NPN transistor 526, the emitter of which is coupled to ground, and the collector of which is coupled through LED 524 to +5 v through resistor 527. Transistor 527 is turned on via bias asserted through base resistor 528 from a flip-flop 530. Actuating the flip-flop to an on condition is carried out from line 532 which extends from the set terminal thereof to the Y5 terminal of decoder 450. The LED 524 is turned off by a reset signal applied to the corresponding terminal of flip-flop 530 via line 534 extending to the decoder 450. As indicated above, decoder 450 is controlled from microprocessor 402 via buses 410 and 452.

The control feature of the apparatus of the invention further includes a grouping of dip switches by which a significant number of operational parameters may be elected by the operator. These switches are represented in FIG. 19C as switch arrays 602 and 604. Each of the switch outputs in arrays 602 and 604 is coupled with a discrete pull-up resistor of a respective pull-up resistor array 606 and 608 and the outputs of the uppermost switch of array 602 is coupled via line 610 to tri-state buffer 506, while the corresponding uppermost switch of array 604 is seen to be coupled via lead 611 to the same buffer. The remaining outputs from switch array 602 are directed to a tri-state buffer 612, while, correspondingly, the remaining switch outputs from array 604 are directed to tri-state buffer 614. Provided, for example, as type 74HC244, the buffers 612 and 614, respectively, are enabled from lines 615 and 616 extending from earlier-described three lead bus 510 and decoder 451. The individual switches within switch array 602 provide for operator selection of a variety of operational aspects, for example, the rate of transmission of coordinate pair signals per second. In this regard, the coordinate pair signals may be transmitted at one pair per second, five pairs per second, 40 pairs per second, and so on. The operator also may set mode switches, electing for example, the mode "point" wherein coordinate pair information or signals are sent when the operator presses a selected button of the switches at stylus 144 or the like for signal presentation through array 498. Further, a "stream" mode may be elected wherein coordinate pair signals are continuously sent, notwithstanding the depression of a switch or the like at the stylus 144. A "switch stream" mode may be elected where the coordinate pair information is sent as a stream of coordinate signals when the button or switch upon the stylus 144 is depressed, such transmission being halted when the switch is released; and an "idle" mode may be elected wherein no coordinate pairs are transmitted. The switches also may be set to elect English or metric calibration. Further, the switches permit the operator to elect the positioning of a carriage return or carriage return-line feed character as a suffix to any transmission, while a BIN/BCD switch election provides for the submittal of data as binary or as converted to ASCII format.

Switch array 604 may be employed for the selection of baud rate by the manipulation of, for example, four switches. The operator also may elect to provide for parallel data at the following or leading edge of a strobe input by manipulation of a "data strobe" switch. The operator further may elect to carry out a status valid check. An even or odd parity may be selected by appropriate switch manipulation, while additional switches may provide for operator election for parity or no parity. The switches also may be adjusted to emulate the output format of various other makes of tablets to promote universal utility. Finally, the switch may be employed to elect the resolution of either a 3 mil or a 5 mil circle of confusion.

GENERAL PROGRAM

Figure 20A:
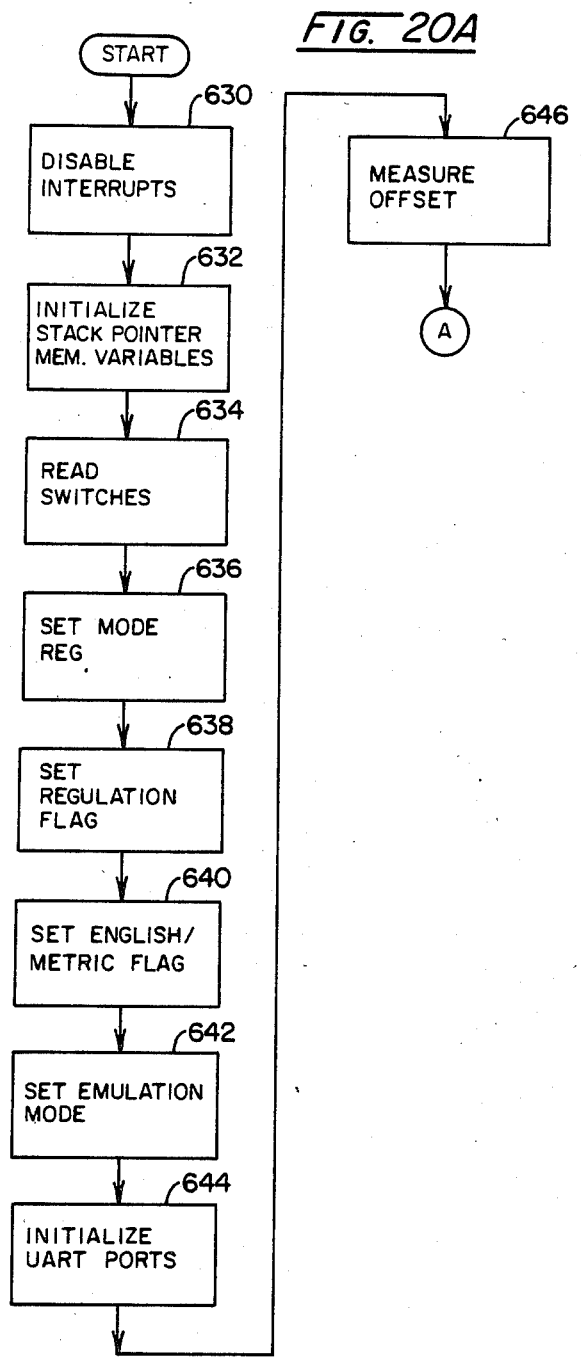

Referring to FIGS. 20A-20D, the overall control program provided by the microprocessor 402 is revealed in diagrammatic fashion. As indicated at the top of FIG. 20A, the program commences upon a start procedure. This procedure generally is commenced by a power up. Following start-up, as represented at block 630, all interrupts within the system are disabled such that no interrupt procedure can be carried out during the initialization of the control system. The program then progresses to initialize stack pointer and memory variables as represented at block 632. Following this task, as represented at block 634, the switches of arrays 602 and 640 (FIG. 19C) are read to provide the operator selected parameters for performance of the system. For some applications, the system can be arranged such that a host computer can override any switch selection by the operator. However, based upon the selection of switches, as represented at block 634, the system then sets the mode registers as represented at block 636. There are four possible modes of operation of the system which have been described above as being "point", "stream", "switch stream", and "idle". Following the setting of the mode register, as represented at block 638 the resolution flag is set for that resolution elected by the operator and, as represented at block 640, the English or metric flag is set depending upon operator election. The program then progresses to the instruction of block 642 wherein a flag is set for the particular emulation mode outputting format and the like elected by the operator. Following the above the program then progresses to the instructions at block 644 wherein the ports of the UART internal to microprocessor 402 (ports TX and RX) are initialized.

As discussed above, because of the drift characteristics which may be exhibited by the analog components of the control circuit, as described in connection with FIG. 18 at switch S19, a positive offset is measured and that offset then is digitzed for use in correcting received coordinate values. This measurement of offset is represented at block 646.

Looking to FIG. 20B, following the completion of initialization procedures as described above, the system is prepared to commence coordinate value measurements. Accordingly, as represented at block 648, the interrupts are enabled and the analog switches S1-S4 (FIG. 16A) are set for an XPLUS (XP) configuration. In this regard, switch S1 will be closed. With the provision of this switch logic, as represented in instruction block 652, a subroutine ADREAD is called so that a digital valuation is developed corresponding with the XPLUS measurement taken. The program then progresses to the instructions at block 654 where the XPLUS measurements in digital format are stored. As represented at block 656, the system then converts to a minus control (XM) wherein switch S2 is closed so that the opposite direction of the x-coordinate may be evaluated. As described at block 658, the ADREAD subroutine is called and a digital valuation for XMINUS is developed and, as represented at block 660, this value is stored, all such storage being effected in RAM in conventional fashion. As represented at node B, the program then progresses to the corresponding node identification in FIG. 20C. Referring to the latter figure, the program is seen to shift to carry out a corresponding set of coordinate measurements along the y-coordinate direction. It may be observed that node B provides for continuation of the program in conjunction with the instruction at block 660 wherein the analog switches S1–S4 are set for a configuration wherein the a.c. excitation source is applied to the plus side of the y-coordinates with a ground applied at all other switching inputs. In this regard, referring additionally to FIG. 16A, switch S3 will be closed and switches S1, S2 and S4 will be opened. Upon the setting of the switches, as represented at block 662, the subroutine ADREAD is called to convert the received signals to digital format. Following this conversion, as represented at block 664, the YPLUS digitized results are stored and the switch system then is set to apply the a.c. source to the negative designated y-coordinate switch as represented at block 666. Thus, switch S4 is closed and switches S1–S3 are open. Following the collection of readings, as represented at block 668, the ADREAD subroutine is called to digitize the resultant values, and as represented at block 670, the results are stored as the YMINUS reading. The program then continues as represented at node C.

Referring to FIG. 20D, node C again is reproduced as leading to block 672, the instructions within which serve to prepare the system for making a next reading. In this regard, the analog switches S1–S4 are set to carry out an XPLUS configuration reading.

The program then progresses to the instruction at block 674 wherein a normalized X value, XNORM, is derived using the difference/sum procedure. The value is considered normalized due to its derivation from the natural coordinates of the position responsive surface. In this regard, the values at this juncture range from a minus value to a positive value. It then is desired to convert the normalized value, XNORM, to a value in a coordinate system running in terms of positive integers, i.e. from a 0 value to some other positive value, because the position responsive surface, particularly as it is associated with the resistive bands or strips described at 66 and 72 in FIG. 3. Consequently, the minimum or 0 value for the position responsive sheet is pre-read and stored in RAM memory for corrective use. This value is designated XMIN. Similarly, the corresponding measurement is taken with respect to the y-coordinate direction, the value YMIN being developed and placed in memory.

As shown in block 676, the program then subtracts the value XMIN from the value for XNORM and multiplies it by an expansion factor designated X$EXPAND. The latter term simply is an expansion factor to provide a large number suited for digital treatment, for example, 64,000.

The program then checks the resultant value for X to assure that no unacceptable number is present. Such a bogus value, for example, might occur where the tracer or stylus has been located outside the active area of the position responsive surface. Accordingly, as represented at block 678, a determination is made as to whether the X value is greater than the known maximum X value, XMAX. In the event that it is, then as represented by line 680, and connector D, the program starts again, returning to the corresponding connector designation in FIG. 20B wherein a command to carry out an analog-to-digital conversion reading is made as represented at block 652. Note that the node D in the latter figure extends to the program via line 682.

In the event that the X value is acceptable with respect to a maximum valuation, then the program looks to the comparison made at block 684 wherein the X value is compared with a minimum or 0 evaluation. Where the X value is below such 0 evaluation, then as represented by lines 686 and 680, the program returns to line 682 as above discussed. Where the X value is correct with respect to to 0, then as represented by line 688, the corresponding operations are carried out with respect to Y valuations. In this regard, as shown at block 690, the normalized Y value, YNORM, is derived as a difference/sum ratio, whereupon, as shown at block 692, a corrected and expanded value for Y is developed and, this value is tested in accordance with the instruction at block 694 to determine whether it is beyond the YMAX value. In the event that is the case, as represented at line 696 and connector D, the program returns to line 682 in FIG. 20B. Where the Y value is correct with respect to YMAX, then as represented at block 698, the value of Y is tested with respect to 0. Where it is less than 0, then as represented by lines 700 and 696, the program returns to line 682 as above discussed. Where the Y value is proper with respect to stylus location and the like, then as represented by block 702 an error correction procedure is carried out which is digital in nature and is provided to correct four variations in the noted resistive strips 66 and 72 (FIG. 3) between each node position which is the position between the resistive strips coupling intermediate two adjacent grid element contacts therewith. A subroutine for carrying out this error correction is described later herein. Following error correction, the data are outputted to the host computer as represented at block 704. This completes the general program, a return then being made to line 682 and connector D as described in conjunction with FIG. 20B.

ANALOG-TO-DIGITAL CONVERSION

It may be recalled that a subroutine referred to as ADREAD was described in conjunction with block 658 and block 668 in respective FIGS. 20B and 20B. This subroutine is described in enhanced detail in conjunction with FIGS. 21A and 21B. Referring to FIG. 21A, following an appropriate start or call for the subject subroutine, the inputs to digital-to-analog converter 372 (FIG. 18) are initialized to an active state of 0 as represented at block 710. The procedure for converting the analog voltage signal at line 364 to a 16-bit number is one of successive approximations in software employing an 8-bit microprocessor arrangement. Thus, all inputs to the digital-to-analog converter are in byte arrangement and therefore, it is necessary to write to the DAC 372 in two bytes. These bytes are identified as D0 and D1. Accordingly, block 710 shows that the least significant eight inputs of the DAC372 are set to 0, or D0=0H (hexadecimal). The program then proceeds to the instruction of block 712 wherein the same procedure is carried out with the most significant eight inputs of DAC 372 wherein they are set to 0 or, stated otherwise, the byte D1 is set to 0H. With the above settings, a loop counter is set to 8 as represented at block 714 and a MASK then is set to 80H to set the most significant bit commencing with a 1.

The program then outputs this most significant byte data to the DAC 372 and this is carried out, as represented at block 718 by ORing D1 with the MASK. Following this outputting to the DAC 372, a settling delay ensues to permit the analog components of the circuit to settle and then a test is carried out. Block 722 shows the test of the system employing the comparator output at line 394 and represented by connector 398. If the comparator output reflects that the DAC 372 input is greater than the analog voltage value developed at line 364, then as represented by line 724 and block 726 the byte D1 is ANDed with MASKNOT such that the applied bit is reset. The program then continues to the instruction in block 728 wherein the MASK is shifted to the right one position to go to the next bit. In the event the test carried out at block 722 indicates that the DAC 372 value is less than the analog input voltage at line 364, then the instructions at block 728 are carried out.

The program then continues as represented at node A in FIG. 15B and block 732 wherein instructions decrementing the loop counter by one are provided. The count then is evaluated by the test at block 734 wherein a determination has been made as to whether it has decremented to 0 representing a testing of 8 bits. In the event the counter is not at a 0 value, then as represented at block 736 and node D, the program returns to the MASK procedure commencing with block 718 as represented in FIG. 15A at the corresponding node and line 738. Where the loop counter has reached 0, then as represented at block 740, the value of the byte B1 is stored and the program commences to look at the low byte by setting the MASK again at 80H as represented at block 742. Upon so setting the mask, as represented at block 744, the lower output bits of DAC 372 are set for the least significant byte such that D0 is made equal to its value ORed with MASK. Following this outputting to the DAC 372, as represented at block 746, a settling delay is permitted to occur, whereupon, as represented at dashed block 748, if the comparator 370 output reflects that the DAC 372 output is greater than the analog output, then as represented a line 750 and block 752, the byte D0 is ORed with MASKNOT and the program proceeds to the instructions of block 754 wherein the MASK is shifted right one position. On the other hand, where the task at block 748 indicates that the comparator output reflects that the analog output of the system is greater than the DAC output, then the MASK shifting procedure of block 754 is carried out.

The program then continues, as represented at node C which is reproduced in FIG. 21C, to decrement the loop counter by one increment as represented at block 758. A test is then carried out as represented at block 760 to determine whether the loop counter has counted through 8 bits and is at a 0 level. Where such 0 level is reached, then as represented at line 760 and node D, the program returns as shown by the same node designation in line 762 in FIG. 15B to commence again with the instructions at line 744. Where the test at block 760 indicates that the loop counter has reached 0, then as represented at block 764, the byte D0 is stored and the program then will have developed a digital value for the analog signal input to the system wherein a combination of the high byte D1 is made with the low byte D0. As represented at block 768, this subroutine then returns to the main program.

ERROR CORRECTION

The error correction system of the invention utilizes the subroutine described in general in connection with block 702 of FIG. 20D. For the instant grid array systems, the correction approach is concerned principally with the necessarily encountered variations in resistance from grid node-to-node or element connection to grid element connection on each of the resistive strips 66 and 72 as shown in FIG. 3. Of course, should discrete resistors be employed with a system, the correction technique would also be effective. Because of the variations in resistance from grid node to grid node occasioned in the manufacture of the present devices, excitation signals applied across the resistor chains or node separated resistive strips will generate voltages or representative signals which will be found to vary from a desired linearity as they are evaluated from one border to the other of the resistive regions. For the system to derive accurate digital output signals corresponding with positions on the position responsive surface of the tablets, some form of correction for this non-linearity is required. However, the requirement for correction must be met with a system and method which remains cost effective and which is capable of carrying out correction without undue delay which, for example, may be occasioned by the computer operations involved in carrying out mathematical procedures. In particular, where such procedures involve multiplication or division, the element of time becomes significant and the corresponding element of cost becomes unacceptably elevated for developing products having a desirably broad market base.

The correction approach of the instant invention is one wherein the characteristics of the resistive strips as at 66 and 72 are determined off line in the course of the manufacture of the digitizers or tablets or the like. A correction table then is developed by computer technique and the correction factors of this table then are incorporated in a memory retained look-up table. Thus, when the digitizers or position responsive surfaces are used in the field or on line, the correction procedure is quite rapid and efficient and variations in the resistance chains or resistive strips can be accommodated quite readily. Typically, the resistive strips described in conjunction with FIG. 1 will exhibit a 5 to 10 percent variation from linearity where, without correction, a 0.1 percent deviation from linearity would normally be tolerable.

Figure 22:
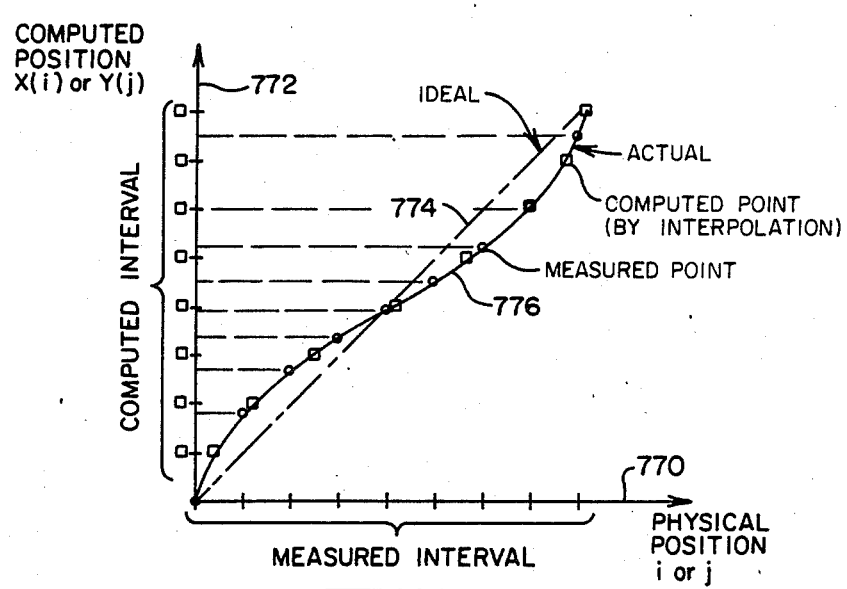
FIG. 22 is a plot comparing physical domain position along a position responsive tablet with respect to computed coordinate position for ideal and typical cases.

The correction technique of the invention with respect to the opaque tablet exemplified in FIG. 1 is one wherein the resistance between each successive node or grid element connection with the resistive strips is measured and the value of resistance thereat determined. Thus, in a physical domain upon the tablets, resistive measurements are taken and coordinates are computed from those measurements. Looking to FIG. 22, an illustrative representation of the approach is provided. In the figure, axis 770 represents the actual physical domain positions between grid elements upon a tablet or surface and positions along this axis 770 are designated i for an x-coordinate and j for y-coordinates. If the resistive strips or chains being evaluated were perfectly linear, then for any given position i or j along axis 770, a corresponding linear position would be evolved along axis 772 representing the computed coordinate position designated x(i) or y(j). Such perfect but practically unattainable linearity can be represented by the straight line 774 such that the measurement of even physical position increments along axis 770 will result in correspondingly even increments along axis 772. However, due to the non-linearity of the resistor chains or strips being evaluated, a curve such as represented at 776 will be generated, the readings for even increments along axis 770 being represented by the small circles defining curve 776. The corresponding increments of computed coordinate position along axis 772 for each of the measured values are represented by the dashed horizontal extensions from the circles to axis 772. Note the non-uniformity of incremental variations. For the illustration at hand, in order for a memory retained look-up table to be practical, the increments developed along axis 772 in the signal domain must be regularly spaced. Such regular spacing corresponding with the incremental spacing along axis 770 would be represented by the box-shaped positions along curve 776. It is the development of the latter regularly spaced increments for the computed positions x(i) or y(j) along axis 772 and the corresponding computation of corresponding physical domain coordinate values at axis 770 which is provided as a correction table in accordance with the present invention. It will occur to those skilled in the art additionally that another approach for the correction would be by polynomial curve fitting procedures.

Referring to FIG. 23A, the off line correction program is represented in flow diagrammatic form. As represented at block 778, a data set is collected from the resistive measurements in a grid-to-grid or node-to-node fashion along the appropriate borders of the tablet, Rx(i) and Ry(j) representing the resistance measurements between these points. Recall that the points measured are in regular increments in the physical domain, those increments being represented as i in a range from 1 to n along the x-coordinate and are represented as j in the physical domain in a range from 1 to n in the y-coordinate direction.

The off line (production) program then serves to compute the values x(i) and y(j) from the collected data set. The equations for developing these computed coordinates are shown in block 780. These coordinates are in the physical domain, representing what positions would be computed as described in conjunction with axis 772 and the small circles defining curve 776 of FIG. 16. Upon deriving the information represented at block 780, the program then carries out the procedures represented in block 782 wherein initial variables are established, the increments i and j being normalized to unity and a determination is made as to how many increments are desired, i.e. what are the bounds of the look-up table. Thus, values $x_{min}$, $x_{max}$, and $y_{min}$, $y_{max}$ are determined.

With the information thus determined, the program proceeds as represented by node A which is reproduced at FIG. 23B with the dashed title block 784. As labelled in block 784, the x correction table is computed and X(i) coefficients are provided to develop the x-coordinate correction table. As represented at block 786, the value of the equal increments employed for the x correction factor is determined and is called $x_r$, a straightforward division being used for this purpose as illustrated. The program then seeks to determine the physical domain value corresponding to the sequence of $x_r$ as represented in block 788. In effect, a search is made for the values of the circles in line 776 which bound each of the uniformly incremented box positions. Thus, for each $x_r$, the search condition is established wherein $x(i')$-$x_r$-$x(i'+1)$. In effect, the value $i'$ is that space in physical domain which corresponds with the increment $x_r$, the equal increment in the signal domain of the system. Once the value of $i'$ is determined, a linear interpolation is carried out as represented at block 790 to find the physical domain x-coordinate coefficient to be placed in the look-up memory. That value corresponds, for example, with the physical domain position along axis 770 of FIG. 16 which corresponds with a given equal increment box position along curve 776. The program then proceeds to the inquiry at block 792 wherein a determination is made as to whether end of the bounds of the table have been reached, i.e. whether i has incremented to the value $i_{max}$. In the event that the maximum value has not been reached, then as represented by line 794 and block 796, the value for i is incremented by 1 and, as represented at line 798, the program continues to compute look-up table coefficients. Where the inquiry at block 792 is in the affirmative, then as represented at node B, the program continues.

Looking to FIG. 23C, node B again is reproduced with the descriptive block in dashed form at 800 showing that the program then carries out the computation of correction table values for the y-coordinate direction. As represented at block 802, the equal increment $y_r$ is computed in similar fashion as described in conjunction with block 786, essentially a division being carried out. With this value, then as represented at block 804, the value in physical domain space of the increment $y_r$ is determined and is designated $j'$. With the latter value, a linear interpolation to determine the y-coordinate coefficient, Y(j) is carried out as illustrated and the value submitted to the look-up table in conjunction with addresses representing the regular incremented signal domain values. The program then proceeds to the inquiry at block 808 wherein a determination is made as to whether the final increment has been evaluated and in the event that it has not, then as represented at line 18 and block 812, the value of j is incremented by 1 and as represented by line 814, the next y-coordinate look-up table entry is determined. Where the inquiry at block 808 is in the affirmative, the program ends as represented at block 816.

Looking now to the details of the error correction routine employed "on line" as referred to at block 702 in FIG. 20D, reference is made to FIG. 24 wherein this routine is seen to commence with the instructions at block 818. It may be recalled that the system will develop a 16-bit word describing an x-coordinate value. Block 818 serves to develop an index for accessing the memory and this is carried out by masking a select number of the low order bits. The number of bits so masked will vary inversely with the number of look-up locations for the memory retained table. For example, the number of N bits masked for 32 entries may be elected as 11, while a table having a 256 entry architecture would require a greater indexing number and so the value for N may be selected, for example, as the lower value, 8. As represented at block 820, the same procedure is utilized for the y-coordinate information and the resultant index values then are provided as $x'$ and $y'$. The program then determines the residual or the low order numbers as represented at block 822 wherein the values x and y are developed which represent the numerical values between the two accessed index points of the table. The actual index for accessing the table is developed in accordance with the instructions at block 824 where an $x_{ndx}$ is made equal to some base value identified as $x_{base}$ plus the index value $x'$. The same arranement is made with respect to the y-coordinate wherein $y_{ndx}$ is made equal to some base value for accessing the table, $y_{base}$ which then is added to the index number, $y'$. With the information then accessed identified as x and y, as represented at block 826, the weighting factors FX1 and FX2 are applied to the x value and the weighting factors FY1 and FY2 are applied to the y values. As before, N is the number of low order bits masked as described above.

The program then continues with the summing instructions as represented at block 828 wherein the corrected value for the x-coordinate and the corrected value for the y-coordinate ($x_{corr}$ and $y_{corr}$) are derived. In this regard, the value XA is the value in the table found at the appropriate index and this value is multiplied by weighting factor FX1. The resultant product then is summed with the product of the next address location in the table, XA multiplied by the weighting factor FX2. The same procedure is employed in developing the corrected y-coordinate value and the two corrected values then are designated x and y as represented at block 830. As shown at block 832, the routine then returns to the main program.

Corrective procedures to be employed with the parallel resistor chain drive as described in conjunction with FIGS. 11A–11C become more elaborate in view of these additional resistor components. A two-dimensional correction technique may be employed for carrying out error correction with this embodiment wherein the equivalent of a stylus 144 is positioned in regular increments in a grid pattern over the surface of the tablet 100 and readings are taken. These readings are then adjusted on a two-dimensional basis to provide the regularly incremented signal domain outputs which are, in turn, converted to physical domain locations. Thus, the look-up table contained in memory holds computed physical domain coordinate values derived as values corresponding with select digital position signals of a signal domain and established for each position within a predetermined grid array of pre-established positions of the physical domain at the tablet surface, adjusted to establish a regularly incremented sequence of address values within the signal domain. The control approach employed off-line with the apparatus then is responsive to each digitized coordinate digital position signal received for deriving an address value corresponding therewith, for accessing the memory at the address value to retrieve the computed physical domain coordinate values corresponding therewith and then functions to adjust the values of these computed physical domain coordinate values by a select or two-dimensional interpolative weighting in correspondence with the received digital position signal. Thus, corrected coordinate pair output signals are produced. For a fuller discourse as to this select, for example two-dimensional approach to correction, reference is made to application for U. S. Pat. Ser. No. 742,733 (supra).

Since certain changes may be made in the above-described system, method and apparatus with out departing from the scope of the invention herein involved, it is intended that all matter contained in the description thereof or shown in the accompanying drawings shall be interpreted as illustrative and not in a limiting sense.

I claim:

1. Position responsive apparatus comprising:
   an insulative support;
   a first array of elongate, thin parallel mutually spaced grid elements located from first to last upon said support,
   a second array of elongate, thin parallel mutually spaced grid elements located from first to last upon said support, spaced from said first array of grid elements and angularly oriented with respect thereto;
   first resistor means coupled with adjacently disposed grid elements of said first array for providing discrete resistances therebetween;
   first terminal means coupled with said first resistor means adjacent said first and last grid elements;
   second resistor means coupled with adjacently disposed grid elements of said second array for providing discrete resistances therebetween;
   second terminal means coupled with said second resistor means adjacent said first and last grid elements;
   a time varying excitation source of select frequency;
   switching means controllable for selectively applying an excitation signal corresponding to said source to said first terminal means during a first operational mode and for selectively applying an excitation signal corresponding to said source to said second terminal means during a second operational mode;
   locator means movable in adjacency about said support for select interaction with said first and second arrays of said grid elements during said first and second modes to effect the derivation of position signals;
   detector circuit means responsive to said position signals for deriving digital position signals;
   memory means addressable for providing computed correction values corresponding with the values of said discrete resistances of said first and second resistor means; and
   control means for controlling said switching means, responsive to said digital position signal for addressing said memory means to acquire corresponding said correction values and for deriving coordinate pair output signals with respect thereto.

2. The position responsive apparatus of claim 1 in which said switching means is controllable to apply an electrical ground to said second terminal means during said first operational mode to establish a ground plane and to apply an electrical ground to said first terminal means during said second operational mode to establish a ground plane.

3. The position responsive apparatus of claim 1 in which said switching means comprises:
   converter means responsive to said source of select frequency for deriving an a.c. current signal therefrom;
   solid-state switch means controllable from said control means to provide open and closed conditions and responsive to said a.c. current signal to effect conveyance thereof at an output when in said closed condition;
   voltage follower means having input terminals coupled with said solid-state switch means output and with ground and having follower means outputs coupled with said first and second terminal means for convertnig said a.c. current signal from said outputs as a said excitation signal in response to a said solid-state switch means closed condition and for deriving a said ground at said follower means outputs in response to a said solid-state switch means open condition.

4. The position responsive apparatus of claim 3 in which said switching means voltage follower means comprises first and second operational amplifier stages coupled with said first terminal means and third and fourth operational amplifier stages coupled with said second terminal means;

said first, second, third, and fourth operational amplifier stages having respective feedback paths incorporating resistor components of select, mutually matched resistance value.

5. The position responsive apparatus of claim 1 in which said memory means computed correction values are provided as physical domain values corresponding with positional outputs of a signal domain established with respect to each said first and second resistor means discrete resistance derived in a physical domain at said adjacently disposed grid elements, adjusted to correspond with a regularly incremented sequence of addressable values within said signal domain.

6. The position responsive apparatus of claim 5 in which said control means is responsive to said digital position signals for deriving said addressable values therefrom, for accessing said memory means at said addressable values to acquire said correction values and for deriving said coordinate pair output signals by interpolative weighting of said acquired correction values.

7. In a system wherein a position responsive surface is selectively accessed to develop electrical signals which are treated to provide outputs corresponding with the accessed position and wherein said surface is configured having an insulative support, a first array of elongate, thin parallel mutually spaced grid elements located from first to last upon said support a second array of elongate, thin parallel mutually spaced grid elements located from first to last upon said support spaced from said first array of grid elements and angularly oriented with respect thereto, first resistor means coupled at node positions with adjacently disposed grid elements of said first array for providing discrete resistances between said node positions, and second resistor means coupled at node positions with adjacently disposed grid elements of said second array for providing discrete resistances therebetween, the method of correcting the value of given said outputs, comprising:

providing a memory for retaining computed physical domain coordinate values derived from values corresponding with select outputs of a signal domain established for each said node position of said first and second resistor means, adjusted in correspondence with a regularly incremented sequence of address values within said signal domain;

deriving a said address value from a said given output;

accessing said memory at said address value to provide a computed physical domain coordinate value by interpolative weighting thereof in correspondence with said given output to derive a corrected said given output; and outputting said corrected given output to provide coordinate information representing said accessed position at said surface.

8. The method of claim 7 in which said address value is derived from select high order bits of a digital signal generated as said given output.

9. The method of claim 8 in which said adjustment of the value of said accessed computed physical domain coordinate value by interpolative weighting is carried out with weighting factors derived from said given output and applied to said accessed computed physical domain coordinate value.

10. The method for generating a memory retained look-up table for use in interpolatively correcting the position outputs in a signal domain corresponding to accessed locations within the signal domain of a position responsive surface of a type including an insulative support, a first array of elongate, thin parallel mutually spaced grid elements located from first to last upon said support a second array of elongate, thin parallel mutually spaced grid elements located from first to last upon said support spaced from said first array of grid elements and angularly oriented with respect thereto, first resistor means coupled at node positions with adjacently disposed grid elements of said first array for providing discrete resistances therebetween, and second resistor means coupled at node positions with adjacently disposed grid elements of said second array for providing discrete resistances therebetween, comprising the steps of:

collecting an input data set from said surface as signal domain outputs established by said discrete resisitances at the said physical domain node positions for said first and second resistor means;

determining the bounds of said input data set as maximum and minimum signal domain values for first and second coordinate directions corresponding, respectively, with said first and second resistor means;

deriving first and second sets of regularly incremented address locatable values extending between said maximum and minimum signal domain values corresponding, respectively, with said first and second coordinate directions;

deriving by linear interpolation the physical domain coordinate location value on said surface corresponding with said address locatable values for each said first and second coordinate directions; and positioning said interpolated physical domain coordinate location values in said memory in combination with corresponding said signal domain address locatable values.

11. Position responsive apparatus, comprising:

an insulative support;

an x-coordinate array of elongate, transparent grid elements extending between first and second borders and located in mutually spaced parallel relationship from first to last upon said support means;

a y-coordinate array of elongate, transparent grid elements extending between third and fourth borders spaced from said x-coordinate array of grid elements and located in mutually spaced parallel relationship from first to last upon said support means;

first x-coordinate resistor means coupled at said first border with adjacently disposed grid elements of said x-coordinate array for providing discrete resistance therebetween;

second x-coordinate resistor means coupled at said second border with adjacently disposed grid elements of said x-coordinte grid array for providing discrete resistances therebetween;

x-coordinate terminal means coupled with said first and second x-coordinate resistor means adjacent said first and last grid elements for conveying excitation signals thereto;

first y-coordinate resistor means coupled at said third border with adjacently disposed grid elements of said y-coordinate array for providing discrete resistances therebetween;

second y-coordinate resistor means coupled at said fourth border with adjacently disposed grid elements of said y-coordinate grid array for providing discrete resistances therebetween;

y-coordinate terminal means coupled with said first and second y-coordinate resistor means adjacent said first and last grid elements for conveying said excitation signals thereto;

a time varying excitation source of select frequency;

switching means controllable for selectively applying an excitation signal corresponding to said source to said x-coordinate terminal means during a first operational mode and for selectively applying said excitation signal to said y-coordinate terminal means during a second operational mode;

locator means movable in adjacency about said support for select interaction with said x-coordinate and y-coordinate arrays of said grid elements during said first and second modes to effect the derivation of position signals;

detector circuit means responsive to said position signals for deriving digital position signals; and control means for controlling said switching means and treating said digital position signals to derive coordinate pair output signals with respect thereto.

12. The position responsive apparatus of claim 11 in which said switching means is controllable to apply an electrical ground to said y-coordinate terminal means during said first operational mode to establish a ground plane with said y-coordinate array of grid elements and to apply an electrical ground to said x-coordinate terminal means during said second operational mode to establish a ground plane with said x-coordinate array of grid elements.

13. The position responsive apparatus of claim 11 in which said switching means comprises:

converter means responsive to said source of select frequency for deriving an a.c. current signal therefrom;

solid-state switch means controllable from said control means to provide open and closed conditions and responsive to said a.c. current signal to effect conveyance thereof to an output when in said closed condition; and voltage follower means having input terminals coupled with said solid-state switch means output and with ground and having follower means outputs coupled with said x-coordinate and y-coordinate terminal means for converting said a.c. current signal from said outputs as a said excitation signal in response to a said solid-state switch means cloud condition and for deriving a said ground at said follower means outputs in response to a said solid-state switch means open condition.

14. The position responsive apparatus of claim 13 in which said switching means voltage follower means comprises first and second operational amplifier stages coupled with said x-coordinate terminal means third and fourth operational amplifier stage coupled with said y-coordinate terminal means said first, second, third and fourth operational amplifier stages having respective feedback paths incorporating resistor components of select, mutually matched resistance value.

15. The position responsive apparatus of claim 11 in which said x-coordinate array and y-coordinate array of said grid elements are provided as indium tin oxide strips.

16. The position responsive apparatus of claim 11 further including:

memory means for retaining computed physical domain coordinate values derived as values corresponding with select said digital position signals of a signal domain and established for each position within a predetermined grid array of pre-established positions of said physical domain, adjusted to establsh a regularly incremented sequence of address values within said signal domain; and said control means is responsive to each given said digital position signal received thereby for deriving a said address value corresponding therewith, for accessing said memory means at said address value to retrieve computed physical domain coordinate values corresponding therewith and for adjusting the values of said computed physical domain coordinate values by select-dimensional interpolative weighting thereof in correspondence with said received digital position signal to derive corrected said coordinate pair output signals.

17. Position responsive apparatus comprising:

a first array of parallel, spaced grid elements arranged in a sequence from first to last and located for nearest operational adjacency with a locator accessible working surface for developing first coordinate position information;

a second array of parallel, spaced grid elements arranged in a sequence from first to last for developing second coordinate position information, spaced a predetermined distance from said first array and angularly disposed with respect thereto to establish cross-over locations of mutually spaced elements respectively within said first and second arrays;

insulative means intermediate said first and second arrays for effecting said spacing therebetween;

said grid elements within said first array having a first width within said cross-over locations and a second width outwardly thereof greater than said first width;

said grid elements within said second array having a third width within said cross-over locations and a fourth width outwardly thereof greater than said third width;

first resistor means coupled with adjacently disposed grid elements of said first array for providing discrete resistances therebetween;

second resistor means coupled with adjacently disposed grid elements of said second array for providing discrete resistances therebetween;

first terminal means coupled with said first resistor means in the vicinity of said first and last grid elements thereof;

second terminal means coupled with said second resistor means in the vicinity of said first and last grid elements thereof;

a time varying excitation source of select frequency;

switching means controllable for selectively applying an excitation signal corresponding to said source to said first terminal means during a first operational mode to establish a potential gradient along said first resistor means, and for selectively applying an excitation signal corresponding to said source to said second terminal means during a second operational mode; and control means for controlling said switching means to derive said first and second operational modes.

18. The position responsive apparatus of claim 17 in which said fourth width is greater than said second width.

19. The position responsive apparatus of claim 17 in which said second width is about 0.59 inch and said fourth width is about 0.79 inch.

20. The position responsive apparatus of claim 17 including:

locator means movable in adjacency about said working surface for select interaction with said first and second arrays of said grid elements during said first and second modes to effect the derivation of position signals;

detector circuit means responsive to said position signals for deriving digital position signals;

memory means addressable for providing computed correction values corresponding with the values of said discrete resistances of said first and second resistor means; and said control means is responsive to said digital position signal for addressing said memory means to acquire corresponding said correction values and for deriving coordinate pair output signals with respect thereto.

21. Position responsive apparatus comprising:

a first array of parallel, spaced grid elements arranged in a sequence from first to last and located for nearest operational adjacency with a locator accessible working surface for developing first coordinate position information;

a second array of parallel, spaced grid elements arranged in a sequence from first to last for developing second coordinate position information, spaced a predetermined distance from said first array and angularly disposed with respect thereto to establish cross-over locations of mutually spaced elements respectively within said first and second arrays;

insulative means intermediate said first and second arrays for effecting said spacing therebetween;

said grid elements within said first array having a first width in the vicinity of said cross-over locations and a second width outwardly thereof greater than said first width;

said grid elements within said second array having a third width in the vicinity of said cross-over locations and a fourth width outwardly thereof greater than said third width;

first resistor means coupled with adjacently disposed grid elements of said first array for providing discrete resistances therebetween;

second resistor means coupled with adjacently disposed grid elements of said second array for providing discrete resistances therebetween;

first terminal means coupled with said first resistor means in the vicinity of said first and last grid elements thereof;

second terminal means coupled with said second resistor means in the vicinity of said first and last grid elements thereof;

third terminal means coupled with said first resistor means at at least one position intermediate said first terminal means;

a time varying excitation source of select frequency;

switching means controllable for selectively applying an excitation signal corresponding to said source to said first terminal means during a first operational mode to establish a potential gradient along said first resistor means, and for selectively applying an excitation signal corresponding to said source to said second terminal means simultaneously connecting said first terminal means and said third terminal means with effective ground during a second operational mode; and control means for controlling said switching means to derive said first and second operational modes.

22. The position responsive apparatus of claim 21 including:

fourth terminal means coupled with said second resistor means at at least one position intermediate said second terminal means; and said switching means is controllable for connecting said second terminal means and said fourth terminal means with effective ground during said first operational mode.

23. The position responsive apparatus of claim 22 including:

fifth terminal means coupled with said first resistor means at a predetermined position intermediate said first terminal means; and said switching means is controllable for applying an excitation signal to said fifth terminal means corresponding to said source and attenuated proportionately with respect to a select value of said potential gradient at said predetermined position during said first operational mode.

24. The position responsive apparatus of claim 23 including:

sixth terminal means coupled with said second resistor means at a predetermined position intermediate said second terminal means; and said switching means is controllable for applying an excitation signal to said sixth terminal means corresponding to said source and attenuated proportionately with respect to a select value of said potential gradient at said predetermined position during said second operational mode.

25. Position responsive apparatus comprising:

a first array of parallel spaced grid elements arranged in a sequence from first to last and located for nearest operational adjacency with a locator accessible working surface for developing first coordinate position information;

a second array of parallel, spaced grid elements arranged in a sequence from first to last for developing second coordinate position information, spaced a predetermined distance from said first array and angularly disposed with respect thereto to establish cross-over locations of mutually spaced elements respectively within said first and second arrays;

insulative means intermediate said first and second arrays for effecting said spacing therebetween;

first resistor means coupled with adjacently disposed grid elements of said first array for providing discrete resistances therebetween;

second resistor means coupled with said adjacently disposed grid elements of said second array for providing discrete resistances therebetween;

first terminal means coupled with said first resistor means adjacent said first and last grid elements thereof;

second terminal means coupled with said second resistor means adjacent said first and last grid elements thereof;

third terminal means coupled with said first resistor means at at least one position intermediate said first terminal means;

fourth terminal means coupled with said second resistor means at at least one position intermediate said second terminal means;

a time varying excitation source of select frequency;

switching means controllable for selectively applying an excitation signal corresponding to said source across said first terminal means and for simultaneously coupling said second and fourth terminal means with ground during a first operational mode, and for applying an excitation signal corresponding to said source across said second terminal means and for simultaneously coupling said first and third terminal means with ground during a second operational mode; and control means for controlling said switching means to derive said first and second operational modes.

26. The position responsive apparatus of claim 25 including:

locator means movable in adjacency about said working surface for select interaction with said first and second arrays of said grid elements during said first and second modes to effect the derivation of position signals;

detector circuit means responsive to said position signals for deriving digital position signals;

memory means addressable for providing computed correction values corresponding with the values of said discrete resistances of said first and second resistor means; and said control means is responsive to said digital position signal for addressing said memory means to acquire corresponding said correction values and for deriving coordinate pair output signals with respect thereto.

27. Position responsive apparatus comprising:

a first array of parallel, spaced grid elements arranged in a sequence from first to last and located for nearest operational adjacency with a locator accessible working surface for developing first coordinate position information;

a second array of parallel, spaced grid elements arranged in a sequence from first to last for developing second coordinate position information, spaced a predetermined distance from said first array and angularly disposed with respect thereto to establish cross-over locations of mutually spaced elements respectively within said first and second arrays;

insulative means intermediate said first and second arrays for effecting said spacing therebetween;

first resistor means coupled with adjacently disposed grid elements of said first array for providing discrete resistances therebetween;

second resistor means coupled with adjacently disposed grid elements of said second array for providing discrete resistances therebetween;

first terminal means coupled with said first resistor means adjacent said first and last grid elements thereof;

second terminal means coupled with said second resistor means adjacent said first and last grid elements thereof;

third terminal means coupled with said first resistor means at a predetermined position intermediate said first terminal means;

fourth terminal means coupled with said second resistor means at a predetermined position intermediate said second terminal means;

a time varying excitation source of select frequency;

switching means controllable for selectively applying an excitation signal corresponding to said source to said first terminal means to establish a first potential gradient along said first resistor means and simultaneously applying an excitation signal to said third terminal means corresponding to said source and attenuated substantially proportionately with respect to a select value of said first potential gradient for said predetermined position during a first operational mode, and for appying an excitation signal corresponding to said source to said second terminal means to establish a second potential gradient along said second resistor means and simultaneously applying an excitation signal to said fourth terminal means corresponding to said source and attenuated substantially proportionately with respect to a select value of said second potential gradient for said predetermined position during a second operational mode; and control means for controlling said switching means to derive said first and second operational modes.

28. The position responsive apparatus of claim 27 including:

locator means movable in adjacency about said working surface for select interaction with said first and second arrays of said grid elements during said first and second modes to effect the derivation of position signals;

detector circuit means responsive to said position signals for deriving digital position signals;

memory means addressable for providing computed correction values corresponding with the values of said discrete resistances of said first and second resistor means; and said control means is responsive to said digital position signal for addressing said memory means to acquire corresponding said correction values and for deriving coordinate pair output signals with respect thereto.

29. In a system wherein a position responsive surface is selectively accessed to develop electrical signals which are treated to provide outputs corresponding with the accessed position and wherein said surface is configured having an insulative support, a first array of elongate, thin parallel mutually spaced grid elements located from first to last upon said support, a second aray of elongate, thin parallel mutually spaced grid elements located from first to last upon said support spaced from said first array of grid elements and angularly oriented with respect thereto to establish a plurality of grid element cross-over regions, first resistor means coupled at node positions from first to last with adjacently disposed grid elements of said first array for providing discrete resistances between said node positions, and second resistor means coupled at node positions from first to last with adjacently disposed grid elements of said second array for providing discrete resistances therebetween, the method of deriving given said outputs, comprising:

providing a time varying source of select frequency and an effective ground;

exciting said first array during a first operational mode by applying said source to said first resistor means adjacent said first node while simultaneously applying said ground to said first resistor means adjacent said last node and subsequently alternating said application of source and ground;

electrically coupling said second array to ground during said first operational mode by applying ground to said second resistor means adjacent said first and last nodes thereof and at at least one select location therebetween;

exciting said second array during a second operational mode by applying said source to said second resistor means adjacent said first node while simultaneously applying said ground to said second resistor means adjacent said last node and subsequently alternating said application of source and ground;

electrically coupling said first array to ground during said second operational mode by applying ground to said first resistor means adjacent said first and last nodes thereof and at at least one select location therebetween;

accessing said surface with a signal responsive locator during said first and second operational modes to develop said electrical signals; and treating said electrical signals to provide coordinate information representing said accessed position at said surface.

30. The method of claim 29 wherein said step of treating said electrical signals comprises the steps of:

providing a memory for retaining computed physical domain coordinate values derived from values corresponding with select outputs of a signal domain established for each said node position of said first and second resistor means, adjusted in correspondence with a regularly incremented sequence of address values within said signal domain;

deriving a said address value from a said given output;

accessing said memory at said address value to provide a computed physical domain coordinate value by interpolative weighting thereof in correspondence with said given output to derive a corrected said given output; and outputting said corrected given output to provide coordinate information representing said accessed position at said surface.

31. The method of claim 30 in which said address value is derived from select high order bits of a digital signal generated as said given output.

* * * * *